US012579969B1

(12) United States Patent
Liu et al.

(10) Patent No.: US 12,579,969 B1
(45) Date of Patent: Mar. 17, 2026

(54) COMPONENT-BASED SELF-LEARNING IN NATURAL LANGUAGE PROCESSING SYSTEMS

(71) Applicant: Amazon Technologies, Inc., Seattle, WA (US)

(72) Inventors: Xiaohu Liu, Bellevue, WA (US); Chenlei Guo, Redmond, WA (US); Zhenyu Yao, Sammamish, WA (US); Ruhi Sarikaya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 310 days.

(21) Appl. No.: 18/205,800

(22) Filed: Jun. 5, 2023

(51) Int. Cl.
| | |
|---|---|
| *G10L 15/06* | (2013.01) |
| *G10L 15/01* | (2013.01) |
| *G10L 15/18* | (2013.01) |
| *G10L 15/19* | (2013.01) |
| *G10L 15/22* | (2006.01) |

(52) U.S. Cl.
CPC ............ *G10L 15/063* (2013.01); *G10L 15/01* (2013.01); *G10L 15/19* (2013.01); *G10L 15/22* (2013.01); *G10L 2015/0635* (2013.01); *G10L 15/1815* (2013.01); *G10L 2015/225* (2013.01)

(58) Field of Classification Search
CPC ....... G10L 15/063; G10L 15/19; G10L 15/22; G10L 15/1815; G10L 2015/0635; G10L 2015/225; G10L 15/18; G10L 15/32; G10L 15/30; G10L 25/51; H04L 67/2857
See application file for complete search history.

(56) References Cited

U.S. PATENT DOCUMENTS

| | | | | |
|---|---|---|---|---|
| 6,226,749 | B1 * | 5/2001 | Carloganu ............ | G06F 21/606 |
| | | | | 726/2 |
| 6,408,272 | B1 * | 6/2002 | White ..................... | G10L 15/30 |
| | | | | 704/E15.047 |
| 6,836,760 | B1 * | 12/2004 | Bellegarda .......... | G10L 15/1822 |
| | | | | 704/238 |
| 8,515,736 | B1 * | 8/2013 | Duta ....................... | G06F 40/30 |
| | | | | 704/9 |
| 8,761,373 | B1 * | 6/2014 | Raghavan ........... | H04M 3/4936 |
| | | | | 704/270.1 |
| 8,838,434 | B1 * | 9/2014 | Liu .......................... | G06F 40/58 |
| | | | | 704/7 |
| 8,983,840 | B2 * | 3/2015 | Deshmukh .............. | G10L 21/10 |
| | | | | 707/750 |

(Continued)

OTHER PUBLICATIONS

Kim, et al., "Modeling dwell time to predict click-level satisfaction," in Proceedings of the 7th ACM International Conference on Web Search and Data Mining, 2014, pp. 193-202.

(Continued)

*Primary Examiner* — Mohammad K Islam
(74) *Attorney, Agent, or Firm* — Pierce Atwood LLP

(57) ABSTRACT

Techniques for self-learning by system components of a natural language processing system are described. A system component may generate and store data indicative of the a hypothesis being tested, which may cause the system to generate output data based on the hypothesis being tested. Based on the stored data, user feedback received during the dialog session may be attributed to the exploring system component. In some embodiments, other system components may be prevented from performing steps that modify the hypothesis being tested.

20 Claims, 10 Drawing Sheets

(56) References Cited

U.S. PATENT DOCUMENTS

| | | | | |
|---|---|---|---|---|
| 9,131,369 | B2* | 9/2015 | Ganong, III | G10L 15/30 |
| 9,405,832 | B2* | 8/2016 | Edwards | G06F 16/9538 |
| 9,484,021 | B1* | 11/2016 | Mairesse | G10L 15/08 |
| 9,514,747 | B1* | 12/2016 | Bisani | G10L 25/60 |
| 9,558,740 | B1* | 1/2017 | Mairesse | G10L 15/22 |
| 9,607,617 | B2* | 3/2017 | Hebert | G10L 15/22 |
| 9,619,459 | B2* | 4/2017 | Hebert | G06F 16/90332 |
| 9,966,065 | B2* | 5/2018 | Gruber | G10L 15/28 |
| 10,018,977 | B2* | 7/2018 | Cipollo | H04L 12/282 |
| 10,388,277 | B1* | 8/2019 | Ghosh | G10L 15/22 |
| 10,515,637 | B1* | 12/2019 | Devries | G10L 15/1822 |
| 10,521,189 | B1* | 12/2019 | Ryabov | G06F 40/117 |
| 10,629,186 | B1* | 4/2020 | Slifka | G10L 15/1815 |
| 2006/0025995 | A1* | 2/2006 | Erhart | G10L 15/1822 |
| | | | | 704/239 |
| 2006/0149544 | A1* | 7/2006 | Hakkani-Tur | G10L 15/22 |
| | | | | 704/E15.04 |
| 2007/0043567 | A1* | 2/2007 | Gao | G10L 15/26 |
| | | | | 704/E15.045 |
| 2008/0059188 | A1* | 3/2008 | Konopka | G10L 15/22 |
| | | | | 704/E15.04 |
| 2010/0268536 | A1* | 10/2010 | Suendermann | G10L 15/22 |
| | | | | 704/E15.008 |
| 2010/0332234 | A1* | 12/2010 | Agapi | G10L 15/22 |
| | | | | 704/E15.04 |
| 2011/0066634 | A1* | 3/2011 | Phillips | G10L 15/22 |
| | | | | 707/769 |
| 2013/0151250 | A1* | 6/2013 | VanBlon | G10L 15/30 |
| | | | | 704/235 |
| 2013/0159000 | A1* | 6/2013 | Ju | G10L 15/1822 |
| | | | | 704/E15.005 |
| 2013/0326353 | A1* | 12/2013 | Singhal | G06F 16/683 |
| | | | | 715/728 |
| 2014/0039899 | A1* | 2/2014 | Cross, Jr. | G10L 15/193 |
| | | | | 704/275 |
| 2014/0046876 | A1* | 2/2014 | Zhang | G06F 16/337 |
| | | | | 706/11 |
| 2014/0058732 | A1* | 2/2014 | Labsky | G10L 15/30 |
| | | | | 704/E15.005 |
| 2014/0207442 | A1* | 7/2014 | Ganong, III | H04W 12/02 |
| | | | | 704/201 |
| 2014/0274203 | A1* | 9/2014 | Ganong, III | G10L 15/02 |
| | | | | 455/563 |
| 2015/0012271 | A1* | 1/2015 | Peng | G10L 15/08 |
| | | | | 704/235 |
| 2015/0120288 | A1* | 4/2015 | Thomson | G10L 15/22 |
| | | | | 704/231 |
| 2015/0120296 | A1* | 4/2015 | Stern | G10L 15/30 |
| | | | | 704/236 |
| 2015/0279352 | A1* | 10/2015 | Willett | G10L 15/30 |
| | | | | 704/231 |
| 2015/0348548 | A1* | 12/2015 | Piernot | H04W 4/025 |
| | | | | 704/235 |
| 2016/0012819 | A1* | 1/2016 | Willett | G10L 15/1815 |
| | | | | 704/240 |
| 2016/0379626 | A1* | 12/2016 | Deisher | G10L 15/197 |
| | | | | 704/235 |
| 2017/0025124 | A1* | 1/2017 | Mixter | G10L 15/32 |
| 2017/0097618 | A1* | 4/2017 | Cipollo | G10L 15/22 |
| 2017/0177716 | A1* | 6/2017 | Perez | G06F 40/30 |
| 2017/0213546 | A1* | 7/2017 | Gilbert | G06F 40/30 |
| 2017/0236512 | A1* | 8/2017 | Williams | G10L 13/02 |
| | | | | 381/79 |
| 2017/0263253 | A1* | 9/2017 | Thomson | G10L 15/22 |
| 2017/0278511 | A1* | 9/2017 | Willett | G10L 25/84 |
| 2017/0278514 | A1* | 9/2017 | Mathias | G06F 16/35 |
| 2017/0294184 | A1* | 10/2017 | Bradley | G10L 25/18 |
| 2018/0018959 | A1* | 1/2018 | Des Jardins | G10L 15/08 |
| 2018/0060326 | A1* | 3/2018 | Kuo | G06F 16/9535 |
| 2018/0061403 | A1* | 3/2018 | Devaraj | G06F 3/167 |
| 2018/0061404 | A1* | 3/2018 | Devaraj | H04L 51/224 |
| 2018/0197545 | A1* | 7/2018 | Willett | G10L 15/005 |
| 2018/0211663 | A1* | 7/2018 | Shin | G10L 15/1815 |
| 2018/0211668 | A1* | 7/2018 | Willett | G10L 15/30 |
| 2018/0233141 | A1* | 8/2018 | Solomon | G06V 40/167 |
| 2018/0247065 | A1* | 8/2018 | Rhee | G06F 21/32 |
| 2018/0268818 | A1* | 9/2018 | Schoenmackers | G10L 15/07 |
| 2018/0294001 | A1* | 10/2018 | Kayama | G10L 15/02 |
| 2018/0314689 | A1* | 11/2018 | Wang | G10L 15/1822 |
| 2018/0330728 | A1* | 11/2018 | Gruenstein | G10L 15/08 |
| 2019/0027147 | A1* | 1/2019 | Diamant | G10L 15/22 |
| 2019/0043509 | A1* | 2/2019 | Suppappola | G10L 17/04 |
| 2019/0043529 | A1* | 2/2019 | Muchlinski | G10L 15/22 |
| 2019/0057693 | A1* | 2/2019 | Fry | G10L 15/26 |
| 2019/0103101 | A1* | 4/2019 | Danila | G10L 15/22 |
| 2019/0214023 | A1* | 7/2019 | Ihara | H04R 1/406 |
| 2019/0295552 | A1* | 9/2019 | Pasko | G06F 3/167 |
| 2019/0371307 | A1* | 12/2019 | Zhao | G10L 15/26 |
| 2019/0392836 | A1* | 12/2019 | Kang | G06F 40/30 |
| 2020/0051547 | A1* | 2/2020 | Shanmugam | G10L 15/22 |
| 2020/0410996 | A1* | 12/2020 | Brandel | G06F 8/44 |
| 2025/0208806 | A1* | 6/2025 | Koyashiki | G06F 3/126 |

OTHER PUBLICATIONS

Zheng, et al., "Investigating examination behavior in mobile search," in Proceedings of the 13th international conference on web search and data mining, 2020, pp. 771-779.

Guo, et al., "Predicting web search success with fine-grained interaction data," in Proceedings of the 21st ACM international conference on Information and knowledge management, 2012, pp. 2050-2054.

Granka, et al., "Eye-tracking analysis of user behavior in www search," in Proceedings of the 27th annual international ACM SIGIR conference on Research and development in information retrieval, 2004, pp. 478-479.

Wu, et al., "Investigating the role of eye movements and physiological signals in search satisfaction prediction using geometric analysis," Journal of the Association for Information Science and Technology, vol. 70, No. 9, pp. 981-999, 2019.

Liu, et al., "Different users, different opinions: Predicting search satisfaction with mouse movement information," in Proceedings of the 38th international ACM SIGIR conference on research and development in information retrieval, 2015, pp. 493-502.

Guo, et al., "Beyond dwell time: estimating document relevance from cursor movements and other post-click searcher behavior," in Proceedings of the 21st international conference on World Wide Web, 2012, pp. 569-578.

Lagun, et al., "Discovering common motifs in cursor movement data for improving web search," in Proceedings of the 7th ACM international conference on Web search and data mining, 2014, pp. 183-192.

Oard, et al., "Implicit feedback for recommender systems," in Proceedings of the AAAI workshop on recommender systems, vol. 83. AAAI, 1998, pp. 81-83.

Hu, et al., "Collaborative filtering for implicit feedback datasets," in 2008 Eighth IEEE international conference on data mining. IEEE 2008, pp. 263-272.

Yi, et al., "Beyond clicks: dwell time for personalization," in Proceedings of the 8th ACM Conference on Recommender systems, 2014, pp. 113-120.

Rosa, et al., "Music recommendation system based on user's sentiments extracted from social networks," IEEE Transactions on Consumer Electronics, vol. 61, No. 3, pp. 359-367, 2015.

Zhao, et al., "Explicit or implicit feedback? Engagement or satisfaction? A field experiment on machine-learning-based recommender systems," in Proceedings of the 33rd Annual ACM Symposium on Applied Computing, 2018, pp. 1331-1340.

Zhang, et al., "Explainable recommendation: A survey and new perspectives," Foundations and Trends® in Information Retrieval, vol. 14, No. 1, pp. 1-101, 2020.

Xian, et al., "Ex3: Explainable attribute-aware item-set recommendations," in Fifteenth ACM Conference on Recommender Systems, 2021, pp. 484-494.

Musto, et al., "A multicriteria recommender system exploiting aspect-based sentiment analysis of users' reviews," in Proceedings of the eleventh ACM conference on recommender systems, 2017, pp. 321-325.

(56) References Cited

OTHER PUBLICATIONS

R. Sarikaya, "The technology behind personal digital assistants: An overview of the system architecture and key components," IEEE Signal Processing Magazine, vol. 34, No. 1, pp. 67-81, 2017.

R. Sarikaya, "Intelligent conversational agents for ambient computing," in Proceedings of the 45th International ACM SIGIR Conference on Research and Development in Information Retrieval, 2022.

Y. Kim, et al., "A scalable neural shortlisting-reranking approach for large-scale domain classification in natural language understanding," CoRR, vol. abs/1804.08064, 2018. [Online]. Available: http://arxiv.org/abs/1804.08064.

Kim, et al., "Efficient large-scale neural domain classification with personalized attention," in Proceedings of the 56th Annual Meeting of the Association for Computational Linguistics (vol. 1: Long Papers). Melbourne, Australia: Association for Computational Linguistics, Jul. 2018, pp. 2214-2224. [Online]. Available: https://aclanthology.org/ p. 18-1206.

R. Khaziev, et al., "FPI: Failure point isolation in large-scale conversational assistants," in Proceedings of the 2022 Conference of the North American Chapter of the Association for Computational Linguistics: Human Language Technologies: Industry Track. Hybrid: Seattle, Washington + Online: Association for Computational Linguistics, Jul. 2022, pp. 141-148. [Online]. Available: https://aclanthology.org/2022.naacl-industry.17.

S. Gupta, et al., "Robertaiq: An efficient framework for automatic interaction quality estimation of dialogue systems," in 2nd International Workshop on Data-Efficient Machine Learning (DeMaL), 2021.

M. Wang, et al., "Joint goal segmentation and goal success prediction on multi-domain conversations," in COLING 2022, 2022. [Online]. Available: https://www.amazon.science/publications/joint-goal-segmentation-and-goal-success-prediction-on-multi-domain-conversations.

Y. Liu, et al., "Roberta: A robustly optimized BERT pretraining approach," 2019.

P. Ponnusamy, et al., "Feedback-based self-learning in large-scale conversational ai agents," in the Thirty-Second Annual Conference on Innovative Applications of Artificial Intelligence, 2020.

S. Yuan, et al., "Graph enhanced query rewriting for spoken language understanding system," in ICASSP 2021, 2021. [Online]. Available: https://www.amazon.science/publications/graph-enhanced-query-rewriting-for-spoken-language-understanding-system.

X. Fan, et al., "Search based self-learning query rewrite system in conversational ai," in 2nd International Workshop on Data-Efficient Machine Learning (De-MaL), 2021.

E. Cho, et al., "Personalized search-based query rewrite system for conversational AI," in Proceedings of the 3rd Workshop on Natural Language Processing for Conversational AI, 2021, pp. 179-188.

P. S. Huang, et al., "Learning deep structured semantic models for web search using clickthrough data," Proceedings of the 22nd ACM international conference on Information & Knowledge Management, 2013.

Y. Shen, et al., "A convolutional latent semantic model for web search," in MSR-TR-2014-55, 2014.

Johnson, et al., "Billion-scale similarity search with GPUS," IEEE Transactions on Big Data, 2019.

D. Bahdanau, et al., "Neural machine translation by jointly learning to align and translate," arXiv preprint arXiv:1409.0473, 2014.

I. Sutskever, et al., "Sequence to sequence learning with neural networks," Advances in neural information processing systems, vol. 27, 2014.

M. Lewis, et al., "Bart: Denoising sequence-to-sequence pretraining for natural language generation, translation, and comprehension," in Proceedings of the 58th Annual Meeting of the Association for Computational Linguistics, 2020, pp. 7871-7880.

L. Li, et al., "A contextual-bandit approach to personalized news article recommendation," in Proceedings of the 19th international conference on World Wide Web, 2010, pp. 661-670.

O. Chapelle, et al., "An empirical evaluation of thompson sampling," in Advances in neural information processing systems, 2011, pp. 2249-2257.

W. R. Thompson, "On the likelihood that one unknown probability exceeds another in view of the evidence of two samples," Biometrika, vol. 25, No. 3/4, pp. 285-294, 1933.

T. Graepel, et al., "Web-scale Bayesian click-through rate prediction for sponsored search advertising in Microsoft's bing search engine," in Proceedings of the 27th International Conference on International Conference on Machine Learning, 2010, p. 13-20.

Hill, et al., "An efficient bandit algorithm for realtime multivariate optimization," in Proceedings of the 23rd ACM SIGKDD International Conference on Knowledge Discovery and Data Mining, 2017, pp. 1813-1821.

Kim, et al., "Deciding whether to ask clarifying questions in large-scale spoken language understanding," in 2021 IEEE Automatic Speech Recognition and Understanding Workshop (ASRU), 2021, pp. 869-876.

S. Park, et al., "A scalable framework for learning from implicit user feedback to improve natural language understanding in large-scale conversational AI systems," in Proceedings of the 2021 Conference on Empirical Methods in Natural Language Processing, 2021, pp. 6054-6063.

A. Baevski, et al., "wav2vec 2.0: A framework for self-supervised learning of speech representations," Advances in Neural Information Processing Systems, vol. 33, 2020.

R. Kohavi, et al., "The surprising power of online experiments," Harvard Business Review, 2017.

Hashemi, et al., "Measuring user satisfaction on smart speaker intelligent assistants using intent sensitive query embeddings," in Proceedings of the 27th ACM International Conference on Information and Knowledge Management, 2018, pp. 1183-1192.

Kiseleva, et al., "Predicting user satisfaction with intelligent assistants," in Proceedings of the 39th International ACM SIGIR conference on Research and Development in Information Retrieval, 2016, pp. 45-54.

Jiang, et al., "Automatic online evaluation of intelligent assistants," in Proceedings of the 24th International Conference on World Wide Web, 2015, pp. 506-516.

Meng, et al., "Predicting user engagement status for online evaluation of intelligent assistants," in European Conference on Information Retrieval. Springer, 2021, pp. 433-450.

Nguyen, et al., "User-Initiated Repetition-Based Recovery in Multi-Utterance Dialogue Systems," in Proc. Interspeech 2021, 2021, pp. 226-230.

Muralidharan, et al., "Leveraging user engagement signals for entity labeling in a virtual assistant," arXiv preprint arXiv:1909.09143, 2019.

A. Rastogi, et al., "Multi-task learning for joint language understanding and dialogue state tracking," in Proceedings of the 19th Annual SIGdial Meeting on Discourse and Dialogue, 2018, pp. 376-384.

S. Karita, et al., "Semi-supervised end-to-end speech recognition," Proc. Interspeech 2018, pp. 2-6, 2018.

Zhu, et al., "Multi-task learning for natural language generation in task-oriented dialogue," in Proceedings of the 2019 Conference on Empirical Methods in Natural Language Processing and the 9th International Joint Conference on Natural Language Processing (EMNLP-IJCNLP), 2019, pp. 1261-1266.

C. Qu, et al., "Weakly-supervised open-retrieval conversational question answering," in European Conference on Information Retrieval. Springer, 2021, pp. 529-543.

J. Wu, et al., "Self-supervised dialogue learning," in Proceedings of the 57th Annual Meeting of the Association for Computational Linguistics, 2019, pp. 3857-3867.

X. Li, et al., "End-to-end task-completion neural dialogue systems," in Proceedings of the Eighth International Joint Conference on Natural Language Processing (vol. 1: Long Papers), 2017, pp. 733-743.

Z. Huang, et al., "Federated learning for spoken language understanding," in Proceedings of the 28th International Conference on Computational Linguistics, 2020, pp. 3467-3478.

(56) References Cited

OTHER PUBLICATIONS

Y. Lu, et al., "Federated natural language generation for personalized dialogue system," arXiv preprint arXiv:2110.06419, 2021.

Su, et al., "On-line active reward learning for policy optimization in spoken dialogue systems," in Proceedings of the 54th Annual Meeting of the Association for Computational Linguistics (vol. 1: Long Papers), 2016, pp. 2431-2441.

S. Lin, et al., "Graph-evolving meta-learning for low-resource medical dialogue generation," in Proceedings of the 35th AAAI Conference on Artificial Intelligence. AAAI Press, 2021, pp. 13 362-13 370.

Qian, et al., "Domain adaptive dialog generation via meta learning," in Proceedings of the 57th Annual Meeting of the Association for Computational Linguistics, 2019, pp. 2639-2649.

Zeng, et al., "Domain adaptive meta-learning for dialogue state tracking," IEEE/ACM Transactions on Audio, Speech, and Language Processing, vol. 29, pp. 2493-2501, 2021.

Hassan, et al., "Beyond clicks: query reformulation as a predictor of search satisfaction," in Proceedings of the 22nd ACM international conference on Information & Knowledge Management, 2013, pp. 2019-2028.

Chen, et al., "Incorporating query reformulating behavior into web search evaluation," in Proceedings of the 30th ACM International Conference on Information & Knowledge Management, 2021, pp. 171-180.

Wang, et al., "Mining term association patterns from search logs for effective query reformulation," in Proceedings of the 17th ACM Conference on Information and Knowledge Management, 2008, pp. 479-488.

Joachims, et al., "Search engines that learn from implicit feedback," Computer, vol. 40, No. 8, pp. 34-40, 2007.

Joachims, "Optimizing search engines using click-through data," in Proceedings of the eighth ACM SIGKDD International Conference on Knowledge Discovery and Data Mining, 2002, pp. 133-142.

* cited by examiner

FIG. 1A

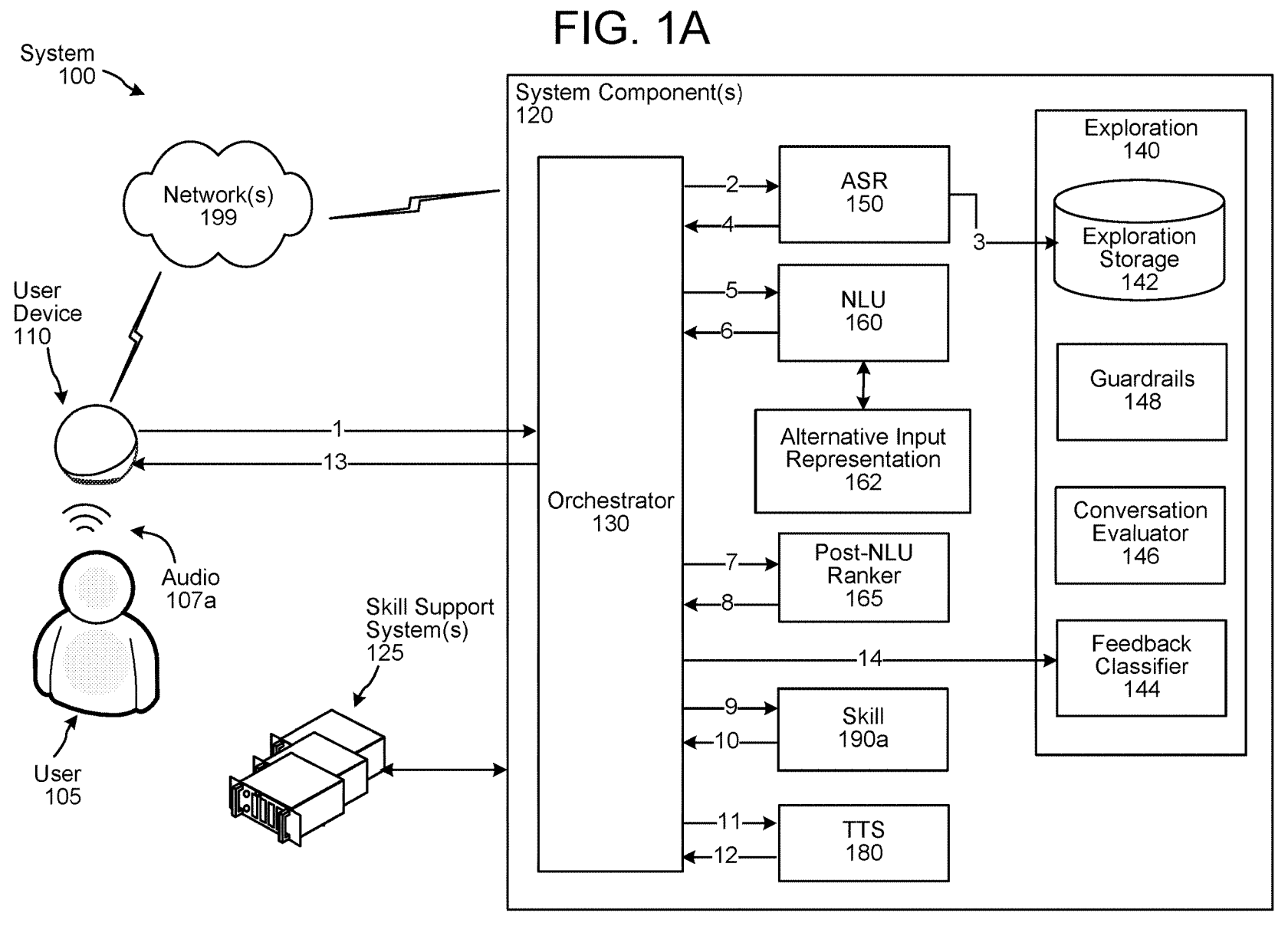

System Component(s) 120

Exploration 140

Exploration Storage 142

Guardrails 148

Conversation Evaluator 146

Feedback Classifier 144

ASR 150

NLU 160

Alternative Input Representation 162

Post-NLU Ranker 165

Skill 190a

TTS 180

Orchestrator 130

Network(s) 199

System 100

User Device 110

Audio 107a

Skill Support System(s) 125

User 105

FIG. 1B

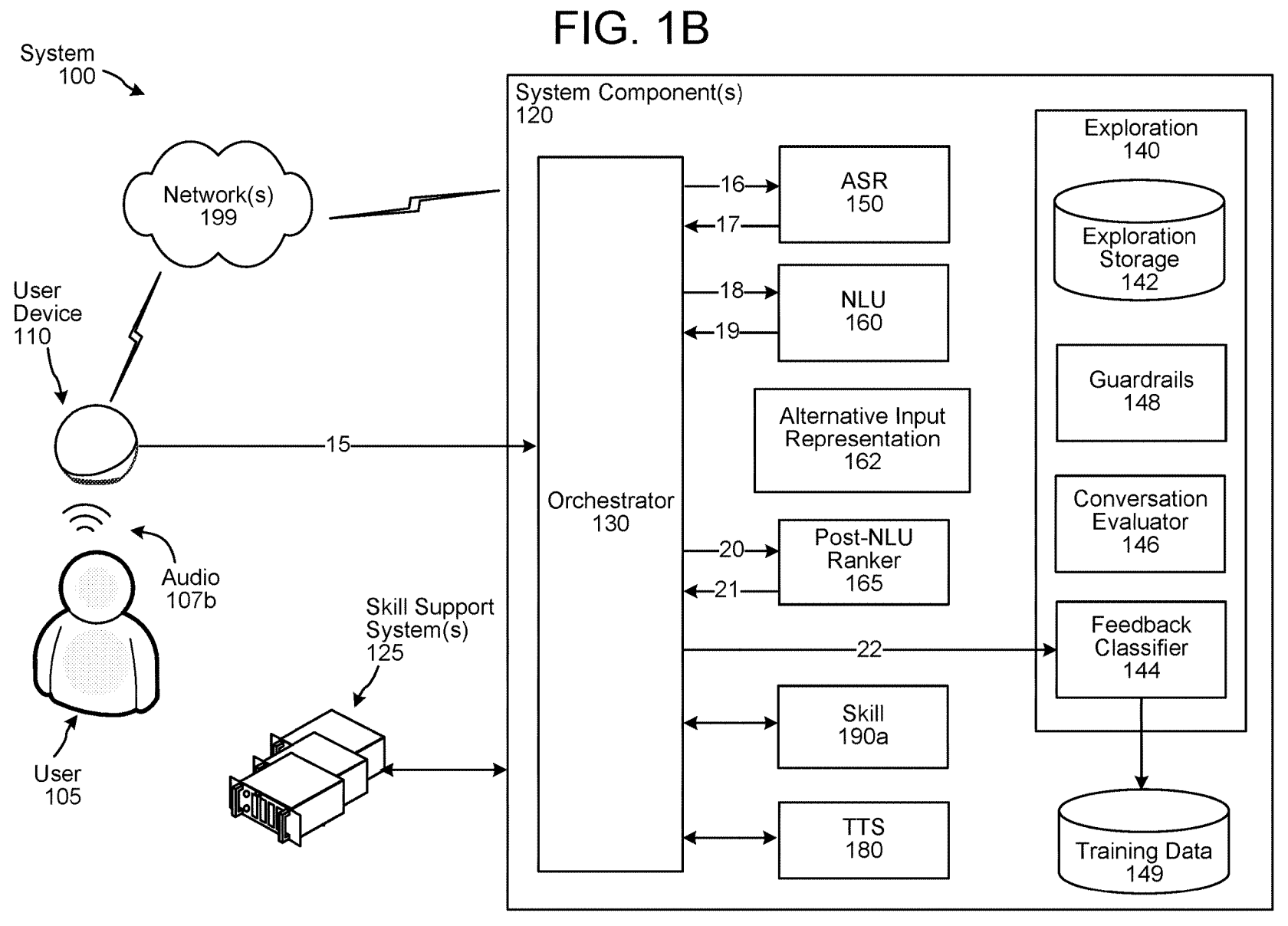

System 100

Network(s) 199

User Device 110

Audio 107b

User 105

Skill Support System(s) 125

System Component(s) 120

Orchestrator 130

ASR 150

NLU 160

Alternative Input Representation 162

Post-NLU Ranker 165

Skill 190a

TTS 180

Exploration 140

Exploration Storage 142

Guardrails 148

Conversation Evaluator 146

Feedback Classifier 144

Training Data 149

Figure 2:
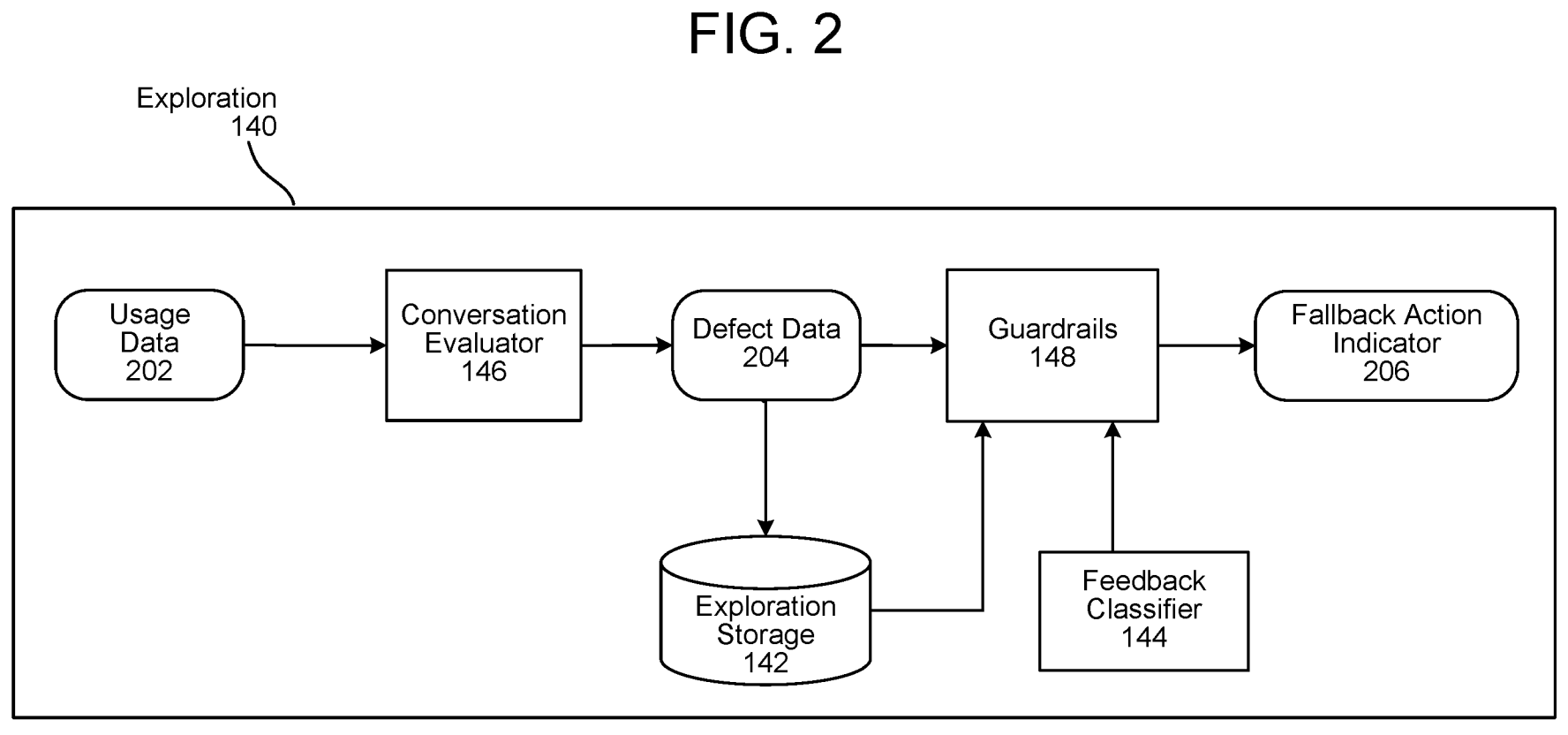

Exploration 140

Usage Data 202

Conversation Evaluator 146

Defect Data 204

Exploration Storage 142

Guardrails 148

Feedback Classifier 144

Fallback Action Indicator 206

FIG. 3

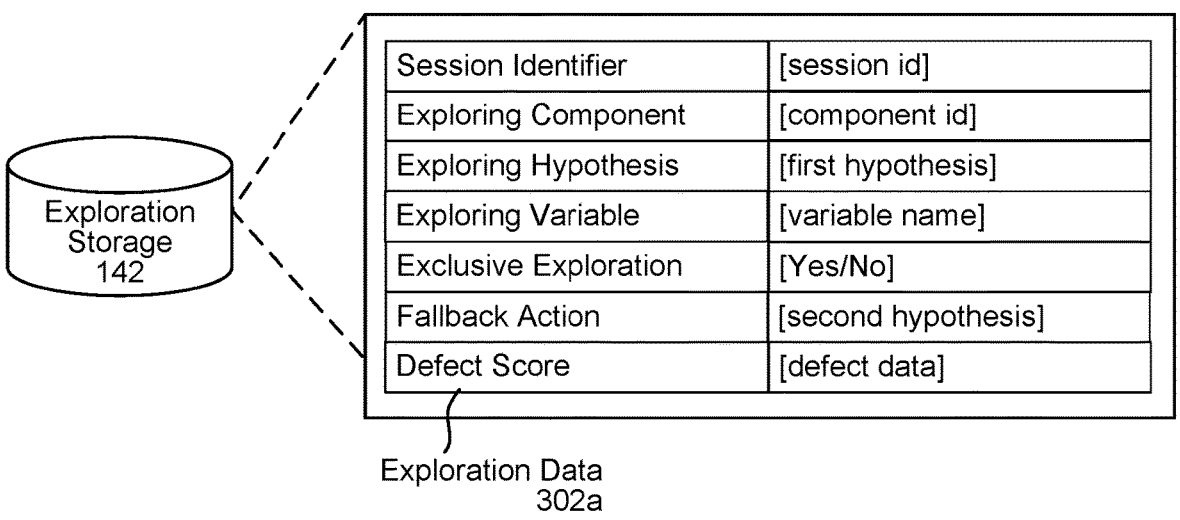

| Session Identifier | [session id] |
|---|---|
| Exploring Component | [component id] |
| Exploring Hypothesis | [first hypothesis] |
| Exploring Variable | [variable name] |
| Exclusive Exploration | [Yes/No] |
| Fallback Action | [second hypothesis] |
| Defect Score | [defect data] |

Exploration Data
302a

FIG. 4

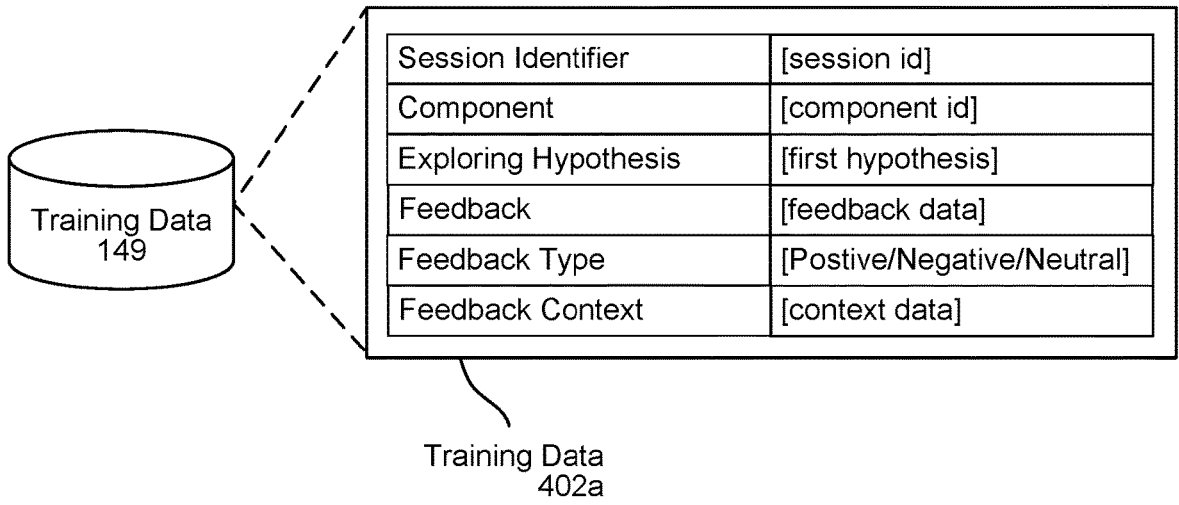

| Session Identifier | [session id] |
|---|---|
| Component | [component id] |
| Exploring Hypothesis | [first hypothesis] |
| Feedback | [feedback data] |
| Feedback Type | [Postive/Negative/Neutral] |
| Feedback Context | [context data] |

Training Data
402a

FIG. 5

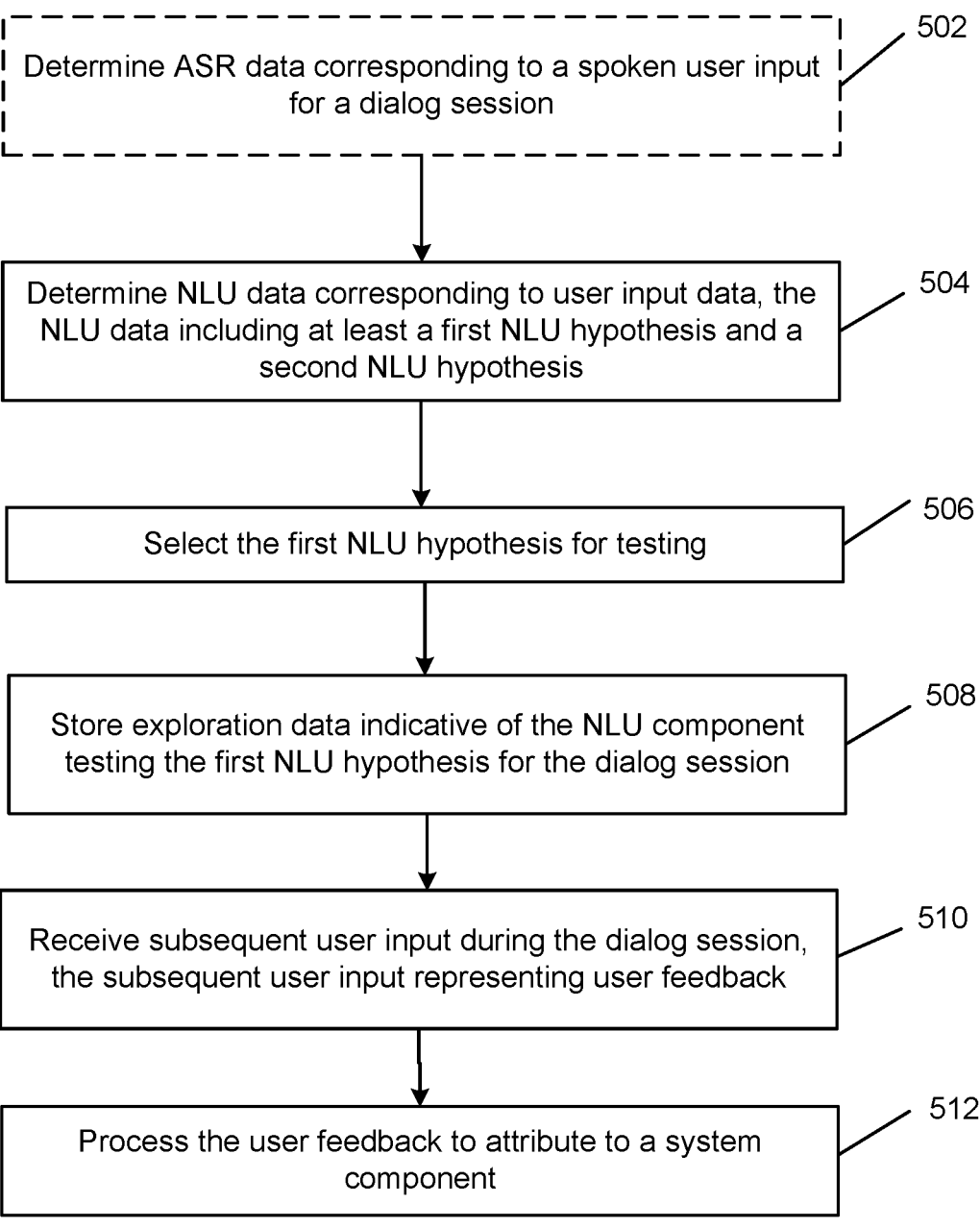

Determine ASR data corresponding to a spoken user input for a dialog session — 502

Determine NLU data corresponding to user input data, the NLU data including at least a first NLU hypothesis and a second NLU hypothesis — 504

Select the first NLU hypothesis for testing — 506

Store exploration data indicative of the NLU component testing the first NLU hypothesis for the dialog session — 508

Receive subsequent user input during the dialog session, the subsequent user input representing user feedback — 510

Process the user feedback to attribute to a system component — 512

FIG. 8

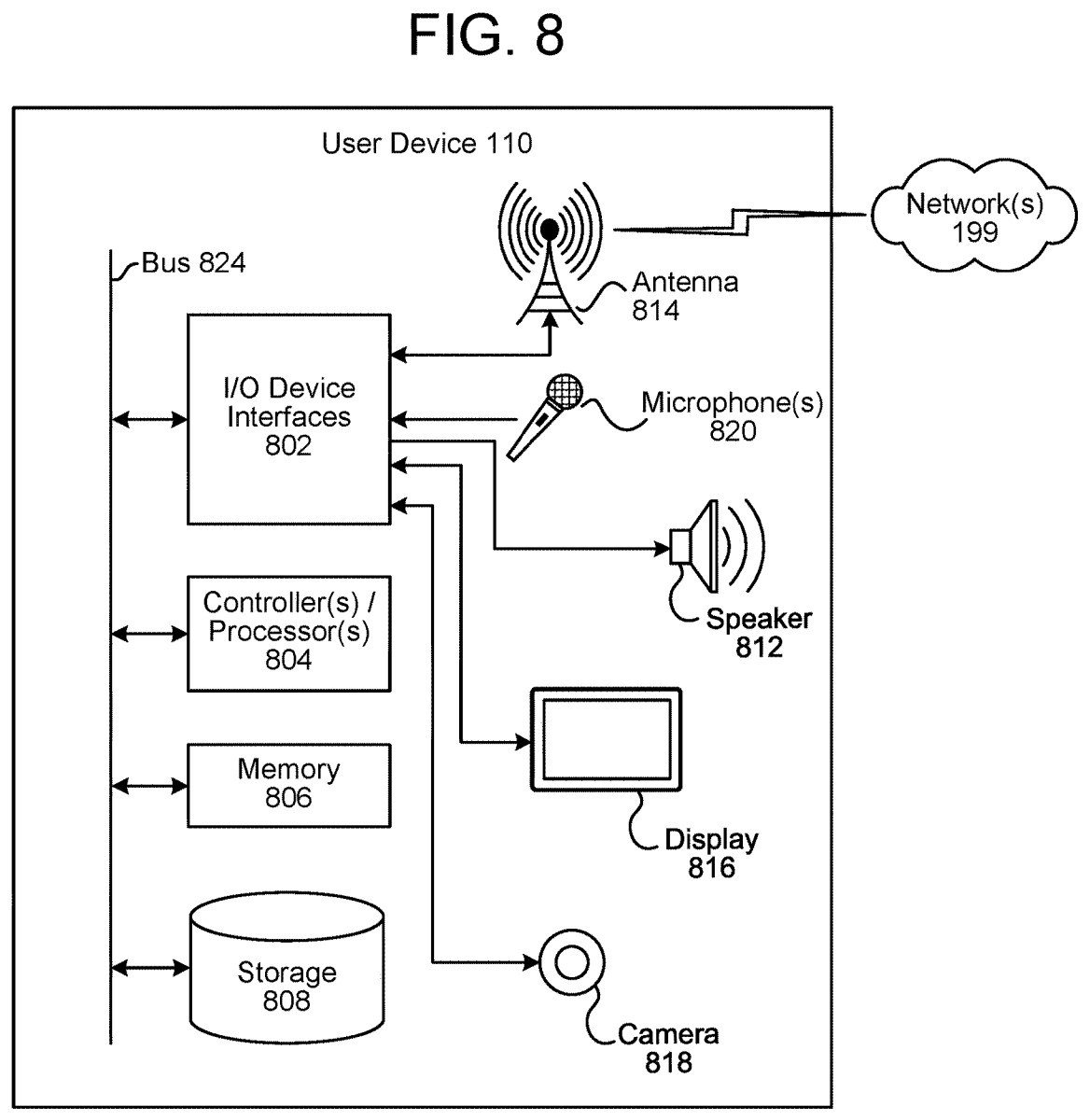

Network(s)
199

User Device 110

Antenna
814

Microphone(s)
820

Speaker
812

Display
816

Camera
818

Bus 824

I/O Device
Interfaces
802

Controller(s) /
Processor(s)
804

Memory
806

Storage
808

FIG. 9

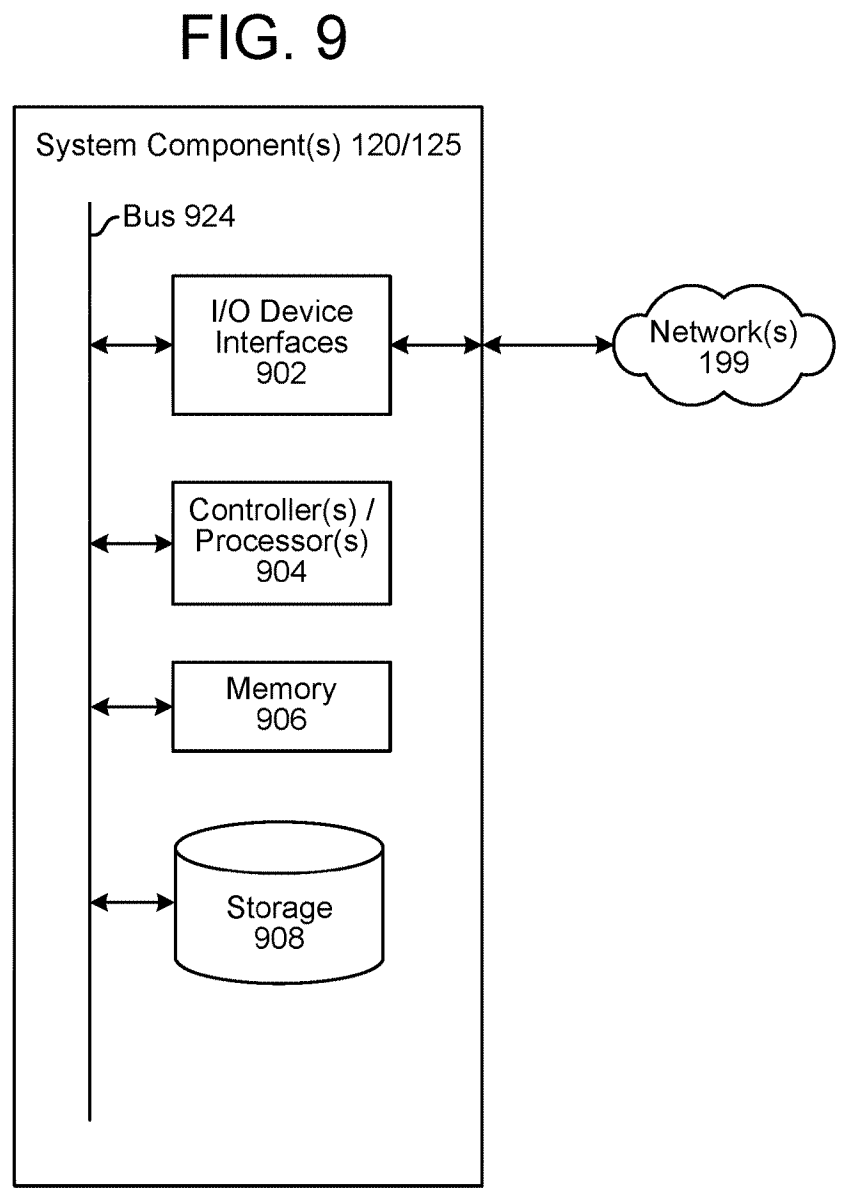

System Component(s) 120/125

Bus 924

Network(s) 199

I/O Device Interfaces 902

Controller(s) / Processor(s) 904

Memory 906

Storage 908

COMPONENT-BASED SELF-LEARNING IN NATURAL LANGUAGE PROCESSING SYSTEMS

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B illustrate a system for processing a spoken user input with an automatic speech recognition (ASR) component performing hypothesis exploration, according to embodiments of the present disclosure.

FIG. 2 illustrates example processing that may be performed by an exploration component, according to embodiments of the present disclosure.

FIG. 3 illustrates example exploration data that may be stored at an exploration storage.

FIG. 4 illustrates example training data that may be stored at a training data storage.

FIG. 5 is a flowchart of an example process that may be performed for a natural language understanding (NLU) component exploring a hypothesis, according to embodiments of the present disclosure.

FIG. 8 is a block diagram conceptually illustrating example components of a device according to embodiments of the present disclosure.

FIG. 9 is a block diagram conceptually illustrating example components of a system according to embodiments of the present disclosure.

DETAILED DESCRIPTION

Figure 6:
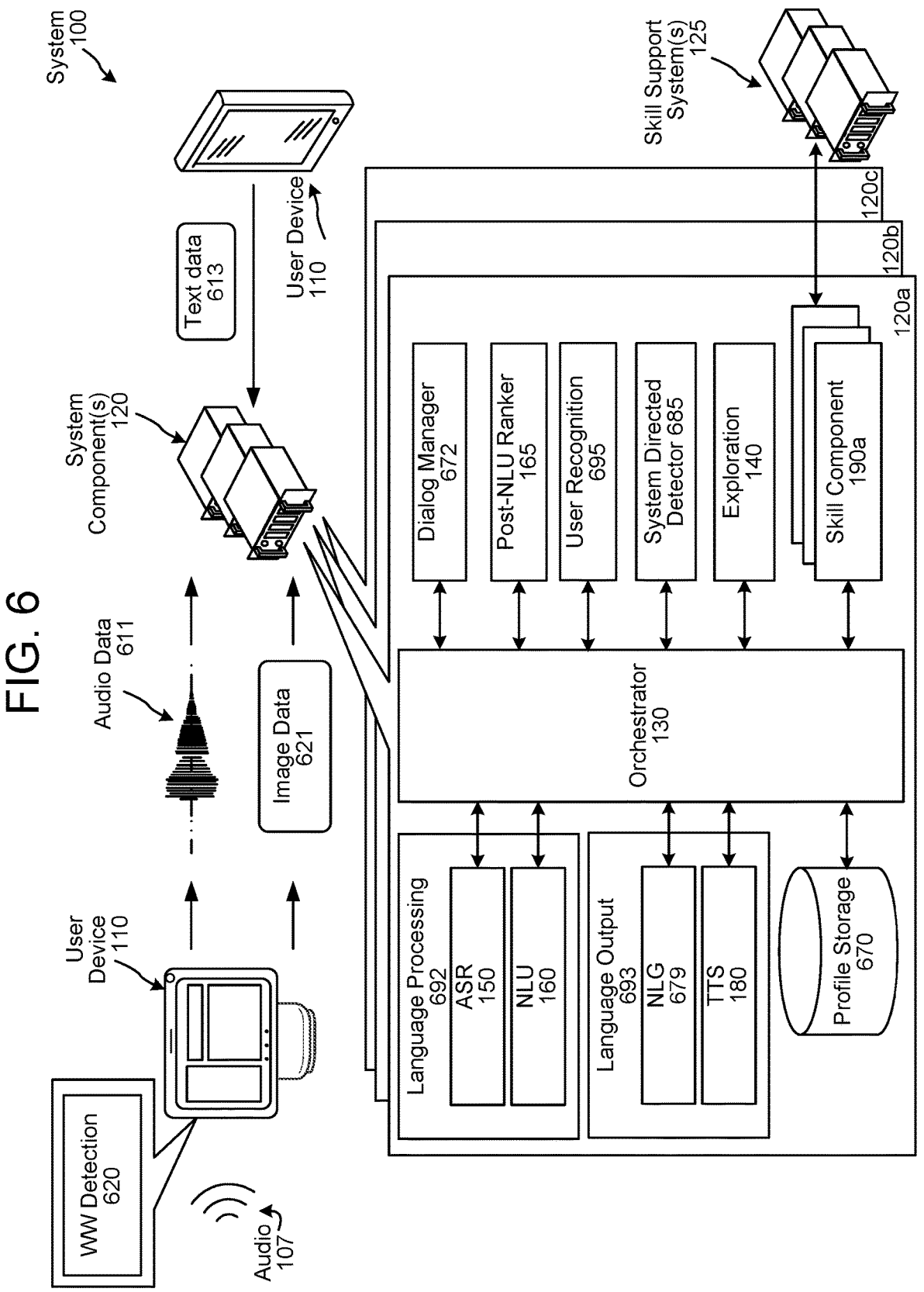
FIG. 6 is a conceptual diagram of components of the system, according to embodiments of the present disclosure.

Automatic speech recognition (ASR) is a field of computer science, artificial intelligence, and linguistics concerned with transforming audio data associated with speech into words (as represented by, e.g., machine/human-readable text, machine-understandable tokens, etc.) representative of that speech. Natural language understanding (NLU) is a field of computer science, artificial intelligence, and linguistics concerned with enabling machines to derive meaning from input containing natural language. Natural language generation (NLG) is a field of artificial intelligence concerned with automatically transforming data into natural language (e.g., English) content. Text-to-speech (TTS) is a field concerning transforming data into audio data that is synthesized to resemble human speech. ASR, NLU, NLG, and TTS may be used together as part of a speech-processing system.

Certain conversational AI systems may be configured to perform actions responsive to user inputs. For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In yet another example, for the user input of "Alexa, set room temperature to 70 F," a system may cause a thermostat to set to the requested temperature.

A conversational AI system may be built as a modular system that uses separate discrete components configured to perform particular tasks of the speech-processing system. To improve user experience, the system components may be updated, for example, based on user feedback.

The present disclosure describes a self-learning framework for a system where individual system components are able to "self-learn" from user feedback. Some system components may perform tasks by determining multiple potential options (e.g., hypotheses) for proceeding with the task. The present disclosure provides techniques for enabling a system component to "explore" a hypothesis by generating an output, responsive to a user input, based on the hypothesis and collect user feedback with respect to the output and the explored hypothesis. In some embodiments, the system of the present disclosure involves assigning user feedback to a system component based on the system component performing certain steps to test a hypothesis. In some embodiments, the system component may explore a hypothesis when another hypothesis having a similar confidence value is generated, and the system component is unsure which hypothesis to proceed with.

The system can track which system component is exploring a hypothesis and which hypothesis is being explored. In some cases, a hypothesis selected by a first component can cause a second component, downstream to the first component, to process based on certain policies (e.g., risk mitigating policies, policies to prevent output of an undesired response, etc.). Such processing by the downstream second component can affect the output presented to a user, and the feedback received in response to the output may be attributable to the second component's processing rather than the first component's processing. In other words, the feedback received in this case may not relate to the hypothesis being explored by the first component. To enable a system component to successfully explore a hypothesis (i.e., receive user feedback with respect to the hypothesis), the system, in some embodiments, may cause downstream components to cease implementation of certain policies/processes.

In some cases, the system may present an undesired response to a user request, which may result in a low-quality user experience. A response may be undesired if it does not provide an output per the user's request. For example, if a system component(s) is unable to process the user request properly, then the system may respond "I am sorry, I cannot help you with that" or other similar outputs. As a further example, if a system component(s) misunderstands what the user said (e.g., misunderstands a song or a movie requested by the user), then the system may respond to the user incorrectly (e.g., output a song or movie different than that requested by the user). In some embodiments, the system may determine that the hypothesis being explored will result in an undesired response being presented to a user. When such a determination is made, the system may select another hypothesis (e.g., a fallback action) to generate an output responsive to the user input, and may thus avoid a low-quality user experience.

Techniques of the present disclosure may provide advantages over other systems. For example, the techniques of the present disclosure may enable individual system components to implement self-learning mechanisms to provide an improved user experience.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A-1B illustrate a system 100 for processing a spoken user input with an ASR component 150 exploring a hypothesis, according to embodiments of the present disclosure. As shown in FIGS. 1A-1B, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system component(s) 120 may include one or more speech processing components configured to process spoken natural language inputs using ASR and NLU processing. The system component(s) 120 may also be configured to process non-spoken inputs, such as gestures, textual inputs, selection of GUI elements, selection of device buttons, etc. The system component(s) 120 may include other components to facilitate user input processing, some of which are described below in relation to FIG. 6.

As shown in FIGS. 1A-1B, the system component(s) 120 may include an orchestrator component 130, an exploration component 140, an ASR component 150, a NLU component 160, an alternative input representation component 162, a post-NLU ranker 165, a skill component 190a and a TTS component 180. The system component(s) 120 may be in direct, wired or wireless communication, over the network(s) 199, with one another. The orchestrator component 130 may be configured to route data to some of the appropriate components of the system component(s) 120 to facilitate processing of and response to a user input. However, the present disclosure is not intended to be limited to such a configuration. In some embodiments, the user device 110 may include or otherwise be configured to perform the herein disclosed processing of one or more of the orchestrator component 130, the exploration component 140, the ASR component 150, the NLU component 160, the alternative input representation component 162, the post-NLU ranker 165, the skill component 190a, and the TTS component 180.

The user 105 may speak an input, and the user device 110 may capture audio 107a representing the spoken input. The user device 110 may send (step 1) audio data (e.g., audio data 611/711 illustrated in FIGS. 6/7, respectively) to the system component(s) 120 for processing. In some embodiments, the user device 110 may send the audio data 611/711 after the user 105 has finished speaking. In other embodiments, the user device 110 may send the audio data 611/711 in a streaming fashion until an endpoint of speech in the audio 107a is determined.

The orchestrator component 130 may send (step 2) the audio data 611/711 to the ASR component 150 for processing. The audio data 611/711 may be associated with a first session identifier corresponding to a dialog session. As used herein, a "dialog," "dialog session," "session," or the like refers to various related user inputs and system responses, for example inputs and outputs related to an ongoing exchange between a user and the system 100.

The ASR component 150 may process the audio data 611/711 to determine ASR data (e.g., token data, text data, ASR hypotheses including token or text data and corresponding confidence scores, etc.) representing the words spoken by the user 105. Further details on the processing of the ASR component 150 are described below in relation to FIG. 6.

The ASR component 150 may determine more than one option, known as a hypothesis, where each hypothesis corresponds to a different interpretation of what the user said, and the individual hypotheses may be associated with corresponding (ASR) confidence values (e.g., score, probability, likelihood, etc.).

As described herein, a system component may explore, also known as testing, a hypothesis to collect user feedback and to self-learn from the user feedback. The exploration component 140 may include components that enable and support exploration of a hypothesis(es) by the system component(s) 120. In some embodiments, the exploration component 140 may include an exploration storage 142 configured to store data relating to a component performing exploration steps. The exploration component 140 may also include a feedback classifier 144, a conversation evaluator 146 and a guardrails component 148. The components of the exploration component 140 may be in communication with one another. Further details on the exploration component 140 are described below in relation to FIGS. 1B, 2, 3 and 4.

In the example of FIG. 1A, the ASR component 150 may test a hypothesis, and may store (step 3) certain data at the exploration storage 142. For example, the ASR component 150 may determine at least a first ASR hypothesis (associated with a first confidence value) and a second ASR hypothesis (associated with a second confidence value) corresponding to the audio data 611/711. The ASR component 150 may select the first hypothesis to explore, and may store (step 3) data indicative of the ASR component 150 exploring the first hypothesis at the exploration storage 142. For example, the exploration storage 142 may store first data indicative of the ASR component 150 (e.g., a component name, a component id, etc.) and second data indicative of the selected first hypothesis. In some embodiments, the exploration storage 142 may store the data (received at step 3) along with a session identifier that is associated with the user input/audio 107a). The data stored at the exploration storage 142 may be used later to facilitate collection of user feedback as described below.

In example embodiments, the ASR component 150 may determine to explore the first or second hypothesis based on the first and second confidence values, of the first and second hypotheses, respectively, satisfying a condition (e.g., the first and second confidence values are similar; the first and second confidence values each satisfy a threshold value; the first and second confidence values are top two of a N-best list; etc.). In other example embodiments, the ASR component 150 may determine to explore the first hypothesis based on the first confidence value satisfying a condition (e.g., the first confidence value does not satisfy a threshold value and is the top hypothesis of a N-best list; the first confidence value satisfies a threshold value and further user feedback is desired to learn; etc.). In other example embodiments, the ASR component 150 may select the first hypothesis to explore based on determining that additional data (e.g., user feedback, downstream component processing information, etc.) corresponding to the first hypothesis is to be collected. In yet other example embodiments, the ASR component 150 may select the first hypothesis to explore based on corresponding context data (e.g., time of day, location, etc. associated with the user input, device type of the user device 110, etc.).

The ASR component 150 may send (step 4) ASR data to the orchestrator component 130. Based on selecting the first hypothesis (which may or may not be the top-scoring hypothesis of a N-best list) for exploration, the ASR component 150, in some embodiments, may send ASR data including the first hypothesis and corresponding data (e.g., the first confidence value, individual token scores, etc.) to the orchestrator component 130. In other embodiments, the ASR component 150 may send ASR data including a N-best list of ASR hypothesis to the orchestrator component 130 along with data indicative of the ASR component 150 testing the first hypothesis. In yet other embodiments, the ASR component 150 may re-rank an initial N-best list so that the updated/re-ranked N-best list includes the first/exploring hypothesis as the first in the list, causing other system component(s) 120, for example the orchestrator component 130, the NLU component 160, etc., to select the first/exploring hypothesis for further processing.

In some embodiments, the orchestrator component 130 or another downstream system component 120 may select an ASR hypothesis for testing. For example, the orchestrator component 130 may select a hypothesis from the N-best list of ASR hypothesis determined by the ASR component 150. The orchestrator component 130 may use similar techniques (e.g., conditions) as described above in relation to the ASR component 150 selecting a hypothesis for testing.

In some embodiments, a hypothesis may be generated by another component that is not part of the system component(s) 120. For example, a different ASR component (e.g., another version, another model, a retrained model, a component that will be put into the production/runtime system, etc.) may generate a hypothesis that is to be tested during runtime. The hypothesis from the different ASR component may be provided to the orchestrator component 130 prior to the user input (of step 1) being received, and the orchestrator component 130 may select this hypothesis for testing based on, for example, the hypothesis corresponding to the user input.

The orchestrator component 130 may send (step 5) the ASR data to the NLU component 160. The NLU component 160 may attempt to make a semantic interpretation of the word(s) or statement(s) represented in the spoken input by determining one or more meanings associated with the word(s) or statement(s) indicated in the ASR data. The NLU component 160 may determine an intent representing an action that a user desires be performed and may determine information that allows a system component and/or device to execute the intent. The NLU component 160 may determine NLU data including one or more NLU hypotheses, where individual NLU hypotheses may include a corresponding domain indicator, intent indicator, entity data (e.g., entity types, entity values), skill indicator, and/or NLU confidence score. Further details on the processing of the NLU component 160 are described below in relation to FIG. 6.

In some embodiments, where the ASR data includes a N-best list and no indication of the ASR component 150 testing a hypothesis, the NLU component 160 may select an ASR hypothesis from the N-best list, and generate NLU data corresponding to the ASR hypothesis selected by the NLU component 160. In this example, based on the ASR data including the first hypothesis or data indicative of the ASR component 150 exploring the first hypothesis, the NLU component 160 may generate NLU data corresponding to the first hypothesis (without performing steps to select an ASR hypothesis if a N-best list is provided). The NLU component 160 may send (step 6) the NLU data to the orchestrator component 130.

In some embodiments, the NLU component 160 may invoke the alternative input representation component 162 to generate an alternative input representation (e.g., a rewrite, a rephrase, etc.) of the user input. The NLU component 160 may invoke the alternative input representation component 162 when one or more of the NLU hypotheses satisfy a condition (e.g., the top-scoring NLU hypothesis does not satisfy a threshold confidence value; two or more of the NLU hypothesis have similar (e.g., low) confidence values; NLU is unable to generate a NLU hypothesis; etc.). The NLU component 160 may receive one or more alternative input representations, corresponding to the user input, from the alternative input representation component 162, and may generate a modified N-best list of NLU hypotheses that may include one or more of the received alternative input representations.

The alternative input representation component 162 may be configured to determine that a user input (e.g., as represented in the ASR data) is likely to result in an undesired response (e.g., an error in processing the user input; misunderstanding what the user said; presenting as output something the user did not request; etc.), and based on that determination may generate an alternative input representation for the user input, where the alternative input representation may result in a desired response to the user input. The alternative input representation component 162 may generate an alternative input representation that corresponds to a different intent, a different entity, a different domain, or that includes different words than the user input represented in the ASR data. The alternative input representation component 162 may generate the alternative input representation based on context data related to the user input, the user device 110 and/or the user 105 (e.g., device type, device location, user input type, time the user input is provided, past user interactions, user preferences stored in profile storage 670, etc.). For example, for a user input "How is the weather in Boston?" an alternative input representation may be "How is the weather in Austin?" (e.g., based on the device location being Austin). As another example, for a user input "Play music by Lady baba" an alternative input representation may be "Play music by Lady Gaga." The alternative input representation component 162 may use various techniques to generate the alternative input representation, for example, one or more machine learning models, rules engine, statistical models, probabilistic models, sequence-to-sequence generation, etc.

In example embodiments, the NLU component 160 may not invoke the alternative input representation component 162 based on the ASR component 150 exploring a hypothesis, so as to avoid the ASR hypothesis being rephrased/rewritten and thus enabling the ASR component 150 to collect feedback on the hypothesis being explored. The NLU component 160 may determine to not invoke the alternative input representation component 162 based on receiving an indication that the ASR component 150 is exploring the first hypothesis (e.g., from the orchestrator component 130; based on the ASR data including the indication; etc.).

In some example embodiments, the NLU component 160 may receive data from the exploration storage 142 which may cause the NLU component 160 to not invoke the alternative input representation component 162. The NLU component 160 may request data from the exploration component 140, and in response to the request, the NLU component 160 may receive exploration data (e.g., exploration data 302a shown in FIG. 3). The exploration data 302a may indicate to the NLU component 160 that the ASR component 150 is exploring a hypothesis during the instant dialog session associated with the first session identifier (stored in the exploration data 302a), and based on that indication, the NLU component 160 may not invoke the alternative input representation component 162 for the instant dialog session associated with the first session identifier.

In some example embodiments, the alternative input representation component 162 may communicate with the exploration component 140 to determine that the ASR component 150 is exploring a hypothesis during the instant dialog session, and in response the alternative input representation component 162 may not generate an alternative input representation for the user input. For example, the exploration component 140 may send the exploration data 302a to the alternative input representation component 162 with or without the alternative input representation component 162 requesting information.

Although not shown in the figures, one or more of the system component(s) 120, including the exploring component, may communicate with the exploration component 140. For example, as described above, the NLU component 160 and/or the alternative input representation component 162 may communicate with the exploration component 140 to determine exploration information related to the instant dialog session.

The orchestrator component 130 may send (step 7) the NLU data to the post-NLU ranker 165, which may determine a skill component appropriate for responding to the spoken user input. Further details on the post-NLU ranker 165 are described below in relation to FIG. 6.

The post-NLU ranker 165 may send (step 8), to the orchestrator component 130, an identifier for the skill component 190a and a selected NLU hypothesis from the NLU data. The orchestrator component 130 may send (step 9) the selected NLU hypothesis to the skill component 190a based on receiving the skill identifier from the post-NLU ranker 165. In some embodiments, the skill component 190a may communicate with a skill support system(s) 125 to generate output data.

The skill component 190a may determine output data responsive to the spoken input. The output data may correspond to a natural language output which may be presented by the device 110 as synthesized speech or displayed text.

The output data may include text, other type natural language representation data, images, graphics, etc. The skill component 190a may send (step 10) the output data to the orchestrator component 130.

In the case where the output data is to be presented as synthesized speech, the orchestrator component 130 may send (step 11) the output data to the TTS component 180. The TTS component 180 may generate output audio data representing synthesized speech corresponding to the output data generated by the skill component 190a. The TTS component 180 may send (step 12) the output audio data to the orchestrator component 130.

The orchestrator component 130 may send (step 13) the output audio data to the user device 110 to cause presentation of the output audio data (e.g., via a speaker(s) of the user device 110). In the case where the output data includes non-synthesized speech output, the orchestrator component 130 may send the output data to the user device 110 causing it to perform an action in accordance with the output data from the skill component 190a. The user device 110 may present audio representing synthesized speech, may display text, graphics, images, etc., may output a notification (e.g., an app notification, a push notification, etc.), may cause a light (e.g., a yellow light ring) or other visual output device to activate, etc. The output data may be presented via the user device 110 or via another device that is associated with the user 105.

Thus, in this example, the output data (sent to the user device 110 at step 13) is based on the first hypothesis selected by the ASR component 150 for exploration. In response to the output data, the user 105 may provide user feedback.

The orchestrator component 130 may send (step 14) dialog data to the feedback classifier 144 of the exploration component 140. The dialog data may include, the first session identifier for the instant dialog session, data representing the user input received at step 1 (e.g., ASR data representing the user input, the first/exploring hypothesis for the user input, etc.) and data representing the system response to the user input provided at step 13 (e.g., output data from the skill component 190 that is used to generate the TTS response). The dialog data may also include, in some embodiments, context data related to the user input and/or the system response, for example, device information for the user device 110 (e.g., device type, device location, device state, etc.), user profile information for the user 105, input type (e.g., speech input, typed input, gesture, etc.), output type (e.g., TTS, device light, etc.), etc. The feedback classifier 144 may determine, using the dialog data, that the user input of the instant dialog session is not feedback to a system response (in other words, the user input is not responsive to a system response), and may thus, not perform further processing with respect to the dialog data.

Referring to FIG. 1B, the user 105 may provide another user input, which may be a second spoken input captured as audio 107b. The user device 110 may send (step 15) audio data 611/711 corresponding to the audio 107b to the orchestrator component 130. The audio data 611/711 may be associated with the first session identifier.

The orchestrator component 130 may send (step 16) the audio data 611/711 to the ASR component 150, and the ASR component 150 may determine (second) ASR data corresponding to the second spoken input. The second ASR data may include a N-best list of ASR hypotheses, without an indication that ASR component is exploring a hypothesis. The ASR component 150 may send (step 17) the second ASR data to the orchestrator component 130.

The orchestrator component 130 may send (step 18) the second ASR data to the NLU component 160. The NLU component 160 may determine (second) NLU data corresponding to at least one of the ASR hypothesis of the second ASR data. In some embodiments, the NLU component 160 may determine that the second spoken input corresponds to a FeedbackIntent. The NLU component 160 may send (step 19) the second NLU data to the orchestrator component 130.

As described above in relation to FIG. 1A, in some cases, the NLU component 160 may invoke the alternative input representation component 162 to generate an alternative input representation for a user input. In this example case, the NLU component 160 may or may not invoke the alternative input representation component 162, although such invocation is not shown in FIG. 1B.

The orchestrator component 130 may send (step 20) the second NLU data to the post-NLU ranker 165. In some embodiments, the post-NLU ranker 165 may determine a skill identifier (e.g., for the skill component 190a) as being capable of responding to the second spoken user input. The post-NLU ranker 165 may send (step 21) at least one NLU hypothesis, via the orchestrator component 130, to the skill component 190a. The skill component 190a may send determine output data responsive to the second spoken input, and may send such output data to the orchestrator component 130. In the case the output data is to be synthesized speech, the orchestrator component 130 may send the output data to the TTS component 180, which may generate output audio data representing synthesized speech. The orchestrator component 130 may send the output audio data to the user device 110 for presentation in response to the second spoken input.

The orchestrator component 130 may send (step 22) updated dialog data to the feedback classifier 144, where the updated dialog data may include the dialog data (from step 14) and further include data representing the second user input, data representing a second system response to the second user input, and context data related to the second user input and corresponding system response. The feedback classifier 144 may process the updated dialog data to determine that the second user input represents feedback to the system response corresponding to the first user input. The feedback classifier 144 may be configured to determine which of the system component(s) 120 the received user feedback relates to. In some embodiments, the feedback classifier 144 is also configured to determine whether the user feedback represents positive feedback, negative feedback or neutral feedback.

User feedback may not only indicate whether the system's response met the users' expectations but may also suggest what went wrong and how the system should have performed in the case of negative feedback. Within a dialog session, a user may provide feedback on the system's responses, either explicitly or implicitly. An example case of implicit feedback is rephrasing. For example, after realizing the song being played is not the one requested, a user may rephrase the initial request with more specifics: "Play [song name] by [artist name]." More implicit feedback can be derived from user behaviors. For example, when the system finds a song that is not what the user wanted, the user may stop playback of it or may barge in, i.e., interrupt the system while it is responding. The feedback classifier 144 may determine that the foregoing example implicit feedback is negative feedback. On the other hand, if the song being played is the one requested, then the user may listen to the song without any immediate action or may tune the volume to the desired level to enjoy it. In this example, the feedback classifier 144 may determine that such implicit feedback is positive feedback.

User feedback can also be explicit, i.e., directly indicating the system's success or failure. For example, in unsolicited cases, the user may provide positive explicit feedback such as "Alexa, you are smart" or "That is helpful, thank you". The user may also express their frustrations, e.g., "No, not that song", which the feedback classifier 144 may determine as negative feedback. In some embodiments, the system can solicit explicit feedback by asking a confirmation question like "Did I play what you wanted?" after the action is taken, or "Did you mean [song name]?" before taking the action.

The feedback classifier 144 may translate user feedback of various types to a discrete category (e.g., positive, negative, neutral, etc.) or a numerical value in a particular range (e.g., 0 to 100, etc.) to measure user satisfaction with each system response.

In some embodiments, the feedback classifier 144 may receive user inputs and system responses of a dialog session. The user inputs may be provided in various forms, for example, speech, keyboard, touchscreen, gestures, etc. Other types of system inputs may also be used by the feedback classifier 144, such as device location, date and time, and user profile data for the user 105 associated with the dialog session. Such system inputs may be considered as contexts for the user feedback. The system's responses such as "Sorry, I do not understand" may be considered by the feedback classifier 144 as implying user dissatisfaction even if the user gives no further feedback on the response.

In some embodiments, the feedback classifier 144 may also receive intermediate processing results (e.g., ASR data, NLU data, skill selection, skill output, etc.) from one or more of the system component(s) 120. For example, ASR data determined by the ASR component 150 may indicate the user said "Stop", which may be classified by the feedback classifier 144 as user dissatisfaction/negative feedback. As another example, domain and/or intent results (included in NLU data) along with timestamps from the NLU component 160 may be considered as implicit feedback representing user satisfaction (e.g., the user has continued playing an album for a period of time without stopping playback).

In some embodiments, the feedback classifier 144 may classify feedback based on determining a sentiment of the feedback. In some embodiments, the feedback classifier 144 may determine that user feedback represents neutral feedback based on it not representing positive or negative feedback.

The feedback classifier 144 may also determine which system component 120 the user feedback relates to. Such determination may be based on the data (e.g., the exploration data 302a) stored in the exploration storage 142 indicating the system component 120 that is exploring during the instant dialog session. In other embodiments, such determination may be based on information included in the user feedback, information derived from the dialog data, and/or information generated by the system component(s) 120 while processing the user input. For example, when the ASR component 150 causes user dissatisfaction in a dialog turn, user feedback may follow a particular pattern that suggests the ASR component is responsible. When a user says "Play it will rain", and the ASR component 150 may incorrectly output ASR data representing "Play evil rain", which may lead to an unresolved entity within NLU processing and generation of a response "Sorry, I cannot find the song evil rain." In the next turn, the user may repeat the request while emphasizing "it will." In this case, the similarity between the first and second turn ASR outputs, and the user's implicit feedback of emphasis (represented in the audio data), may indicate that the user feedback relates to ASR processing. As another example, when NLU processing causes user dissatisfaction (or satisfaction), the user feedback may follow a particular pattern where an entity, an intent, a domain, or an action may be indicated. For example, the user may say "That's the wrong song", indicating that an issue with entity recognition and/or entity resolution occurred. As another example, the user may say "Play the movie, not the book," indicating that an issue with domain classification occurred. In some cases, the confidence value(s) for ASR processing and NLU processing may be considered to determine whether the user feedback relates to ASR processing or NLU processing. For example, if ASR processing is confident (e.g., the confidence value satisfies a condition) and NLU processing is not confident, then the feedback may be attributed to NLU processing.

In this example of FIG. 1B, the feedback classifier 144 may determine that the user feedback, represented by the second NLU data and associated with the first session identifier, corresponds to the ASR component 150 based on the exploration storage 142 storing data indicative of the ASR component 150 performing exploration during this dialog session associated with the first session identifier. The feedback classifier 144 may store the second NLU data (and/or the second ASR data received from another component, such as the orchestrator component 130), along with an indication that it corresponds to the ASR component 150 exploration of the first hypothesis, in training data storage 149. For example, the second NLU data and/or the second ASR data may be stored in the training data storage 149 along with the first session identifier, which the ASR component 150 can use to identify that the instant session is an exploration of the first hypothesis. At a later time, the ASR component 150 may receive data from the training data storage 149 to perform one or more updating steps (e.g., retraining of one or more ASR models, algorithms, policies, etc.). In some embodiments, the training data storage 149 may also store an indication of whether the user feedback is positive, negative, or neutral. In some embodiments, the ASR component 150 may perform the updating steps on a periodic basis (e.g., weekly, monthly, etc.). In other embodiments, the ASR component 150 may perform the updating steps when a particular amount of training data has been stored at the training data storage 149.

In some embodiments, the feedback classifier 144 may attribute the user feedback of an instant dialog session to the system component 120 that is exploring during the instant dialog session. In other embodiments, the feedback classifier 144 may attribute the user feedback to a system component other than the one or in addition to the system component 120 that is exploring during this dialog session.

The system component 120 may update based on the training data storage 149, which may involve retraining one or more models of the system component 120. Training data for retraining may include as positive samples user inputs and corresponding hypotheses that resulted in collection of positive user feedback, and as negative samples user inputs and corresponding hypotheses that resulted in collection of negative user feedback. In some embodiments, the system component 120 may update based on the training data storage 149 using reinforcement learning techniques, where a tested hypothesis that results in positive user feedback is used to reinforce the use of that hypothesis for the user input (or similar user inputs) and a tested hypothesis that results in negative user feedback is used to penalize the use of that hypothesis for the user input (or similar user inputs).

In some embodiments, one or more of the system components 120 may be prevented from exploring a hypothesis (e.g., performing steps to explore a hypothesis, including storing exploration data with the exploration component 140) when another system component is exploring a hypothesis, in particular in an exclusive exploration session. For example, the NLU component 160 may communicate with the exploration component 140 to initiate/request exploration of a hypothesis, and the exploration component 140 may send data (e.g., denial of the request) to the NLU component 160 that causes the NLU component 160 to not explore a hypothesis. In example embodiments, the exploration component 140 may send the exploration data 302*a* to the NLU component 160, in response to which the NLU component 160 does not perform exploration steps. In other example embodiments, the exploration component 140 may send data indicating generally that another component is exploring during the instant dialog session, in response to which the NLU component 160 does not perform exploration steps. In yet other example embodiments, the exploration component 140 may reject or deny the NLU component's request to explore.

In another example embodiment, the system may present to the user 105 an output soliciting explicit feedback with respect to a hypothesis being explored by the system component 120. Output data requesting user feedback may be sent to the user device 110. For example, before processing with respect to the exploring hypothesis, the output data may request user confirmation to perform an action using the exploring hypothesis (e.g., "Did you mean [representation of exploring hypothesis]?"). If the user 105 confirms performance of the action, then the feedback classifier 144 may determine positive user feedback regarding the exploring hypothesis. On the other hand, if the user 105 does not confirm the performance of the action or requests a different action to be performed, then the feedback classifier 144 may determine negative user feedback regarding the exploring hypothesis.

As another example, after processing with respect to the exploring hypothesis and presenting resulting output data to the user 105, the system may request user feedback with respect to the output data (e.g., "Was [the output data] correct?"). The user response to the request may be classified by the feedback classifier 144 appropriately (e.g., "yes" as positive feedback for the exploring hypothesis; "no" as negative feedback for the exploring hypothesis).

Output data requesting explicit feedback from the user 105 may be generated by a feedback skill component 190*b* or another component of the system components 120. In some embodiments, the feedback requesting component may use natural language generation (NLG) techniques to generate the request, and may thus, in some embodiments, communicate with a NLG component 679 (shown in FIG. 6).

FIG. 2 illustrates example processing that may be performed by some components of the exploration component 140. The conversation evaluator 146 may be configured to process one or more user inputs and corresponding system responses to determine a "defect" score corresponding to an instant user input. A defect score, as used herein, refers to a likelihood of the user input being processed by the system component(s) 120 in a successful manner so that processing results in a desired response to the user input. A defect score that satisfies a condition, for example in some cases that exceeds a threshold value, may represent that processing of the user input is likely to result in a desired response. In other example cases, depending on system configuration, a defect score that satisfies the condition may represent that processing of the user input is likely to result in an undesired response.

The conversation evaluator 146 may process usage data 202, which may include dialog data representing a user input(s) provided by the user 105 during the instant dialog session and a system response(s) presented to the user 105 during the instant dialog session. In some embodiments, the usage data 202 may include natural language data, text data or other type of data representing the user input(s) and the system response(s). In some embodiments, the usage data 202 may include NLU data (e.g., intent, entity, domain, etc.) corresponding to the user input(s), and a skill identifier corresponding to the skill component 190a that determined the system response(s). The usage data 202 may include one or more turn identifiers, where each is associated with the corresponding user input and system response. In some embodiments, the usage data 202 may include data representing the instant user input (i.e. the user input of the most recent dialog turn). In other embodiments, data representing the instant user input may be provided to the conversation evaluator 146 separately.

The conversation evaluator 146 may implement one or more of machine learning models, rules engines, statistical models, probabilistic models, etc. In example embodiments, the conversation evaluator 146 may include an encoder(s) to encode the user input(s) and the system response(s) in the usage data 202. In example embodiments, the conversation evaluator 146 may include a classifier that processes encoded representations of the user input(s) and system response(s) to determine whether processing of the instant user input will result in an undesired response. In some embodiments, the conversation evaluator 146 may be trained using past dialog data and corresponding defect score.

The conversation evaluator 146 may output defect data 204, which may include a defect score corresponding to the instant user input. In some embodiments, the defect data 204 may include other information, such as data that may contribute to the determination of the defect score (e.g., an intent label associated with a low confidence value, an entity label associated with a low confidence value, a token/word associated with a low confidence value, etc.). The defect data 204 may be stored in the exploration storage 142 in association with data corresponding to the instant user input.

The guardrails component 148 may process the defect data 204 to determine whether exploration of a hypothesis (e.g., the first hypothesis described with respect to FIGS. 1A and 1B) should be stopped. In some embodiments, the guradrails component 148 may also receive data from the feedback classifier 144 representing user feedback received during the instant dialog session (e.g., positive, negative, neutral, etc.) and indicating a system component the feedback relates to. In some cases, exploration of a hypothesis may result in a low-quality user experience, and instead of allowing the system component to continue to explore such a hypothesis (during the instant dialog session or in future dialog sessions), the exploration component 140 may prevent such exploration from occurring. In such cases, the guardrails component 148 may select a fallback action that causes another hypothesis (e.g., a second hypothesis) to be selected for processing by downstream components. The fallback action hypothesis may be stored in the exploration storage 142 (as described below in relation to FIG. 3). The guardrails component 148 may output a fallback action indicator 206, which in some embodiments, may be a value (e.g., a Boolean value (yes/no; 0/1; false/true)) indicating whether or not the fallback action should be implemented in the future. In some embodiments, the guardrails component 148 may also prevent generation of output data based on the exploring hypothesis during the instant dialog session (e.g., during a future turn of the session). In some embodiments, the orchestrator component 130 may cause further processing with respect to the fallback action rather than the exploring hypothesis by communicating the fallback action to the system component(s) 120 for processing. In some embodiments, for future dialog sessions, the exploration component 140 may prevent exploration with respect to the first hypothesis based on data indicating that the fallback action is to be selected instead. In some embodiments, based on data determined by the feedback classifier 144, the exploration component 140 may prevent a particular system component (e.g., the system component user feedback is attributed to) from processing with respect to the exploring hypothesis.

The guardrails component 148 may implement one or more of machine learning models, rules engines, statistical models, probabilistic models, etc. In example embodiments, the guardrails component 148 may be trained using past exploration data (similar to the data shown in FIG. 3) corresponding to past exploration sessions performed by one or more of the system component(s) 120. In some embodiments, the guardrails component 148 may also consider past exploration data when processing with respect to the instant dialog session. For example, the guardrails component 148 may determine metrics relating to the hypothesis being explored, where such metrics may indicate a number of times the hypothesis has been explored, a number of times positive feedback was received with respect to the hypothesis, a number of times negative feedback was received with respect to the hypothsis, etc.

FIG. 3 illustrates example exploration data 302 that may be stored at the exploration storage 142. As shown, exploration data 302a for an individual exploration session (e.g., dialog session) may include a session identifier, which may be the session identifier for the instant dialog session, exploring component information, which may be an identifier of the component exploring (e.g., ASR component 150, NLU component 160, alternative input representation component 162, post-NLU ranker 165, TTS component 180, etc.), and an exploration hypothesis, which may be data indicative of the hypothesis being explored.

In some embodiments, the exploration storage 142 may also store data indicative of a variable being explored during the session. For example, for exploration by the ASR component 150, the variable may be "utterance" indicating that hypothesis for the spoken input is being explored. As a further example, for exploration by the NLU component 160, the variable may be "intent" indicating that hypothesis for the intent for a user input is being explored, "entity" indicating that hypothesis for the entity for a user input is being explored, or "domain" indicating that hypothesis for the domain for a user input is being explored. As yet a further example, for exploration by the post-NLU ranker 165, the variable may be "domain" indicating that hypothesis for the domain is being explored, or "skill" indicating that hypothesis for the skill component for a user input is being explored. As another example, for exploration by the TTS component 180, the variable may be "persona" indicating that a persona type hypothesis (e.g., default Alexa persona, celebrity persona, etc.) is being explored, the variable may be "style" indicating that a response style type hypothesis (e.g., brief response, long response, casual vs. formal, etc.) is being explored, etc.

In some embodiments, the exploration storage 142 may store data indicative of whether the exploration is an exclusive session or inclusive session. Such information may be indicated by a Boolean value. For example, for a exclusive session, the data field may be set to "yes" and for an inclusive (or non-exclusive) session, the data field may be set to "no." The exploration component 140 may enable a system component to perform an exclusive exploration session, where only the single system component (e.g., the ASR component 150 in the example of FIGS. 1A-1B) is allowed to explore during the instant dialog session. During the exclusive exploration session, other system component(s) may be prevented from performing certain steps that can result in modification of the hypothesis being explored. For example, if the ASR component 150 is performing an exclusive exploration session for a first ASR hypothesis, then the alternative input representation component 162 may be prevented (via the NLU component 160) from generating an alternative input representation that modifies the first ASR hypothesis. As another example, if the NLU component 160 is performing an exclusive exploration session for a first NLU hypothesis, then the post-NLU ranker 165 may be prevented from selecting a different/second NLU hypothesis. An exclusive exploration session may ensure that user feedback with respect to the exploring hypothesis is collected and can be attributed to the exploring component. In other words, an exclusive exploration session may prevent interference from downstream components and allow the system response to the user input to be based on the exploring hypothesis.

During an inclusive exploration session, one or more of the system component(s) 120 may be allowed to perform steps that modifies the exploring hypothesis. For example, the alternative input representation component 162 may generate an alternative input representation for a first ASR hypothesis (being explored) and the generated alternative input representation may be provided to the NLU component 160 and the post-NLU ranker 165 for further processing. As another example, the post-NLU ranker 165 may select a different NLU hypothesis than a first NLU hypothesis being explored.

User feedback received during an inclusive exploration session may be processed by the feedback classifier 144 and may be attributed to the exploring component and/or other system component(s) 120 based on the content of the user feedback. In some cases, the user feedback may specific such that it can be attributed to a particular system component 120. Example specific user feedback such as "That is not what I said", a repeat of an initial user input or other similar feedback, may be attributed by the feedback classifier 144 to the ASR component 150. Example specific user feedback such as "That is not the [entity] I requested", "I didn't mean that" or other similar feedback, may be attributed to the NLU component 160. Example specific user feedback such as "Alexa, I didn't say your name" or "Alexa, I am not talking to you" may be attributed to a wakeword detection component 620 (shown in FIG. 6).

In other cases, the user feedback may be generic such that it cannot be attributed to a particular system component 120 (e.g., user says "stop", "this is stupid", etc.). In such cases, for example, the feedback classifier 144 may determine which system component is exploring and may attribute the user feedback to the exploring component. As another example, the feedback classifier 144 may determine whether the exploring hypothesis was modified by another system component and may attribute the user feedback to the hypothesis modifying system component instead of or in addition to the exploring component. In yet another example, the feedback classifier 144 may attribute the generic user feedback to all of the system component(s) 120.

Figure 7:
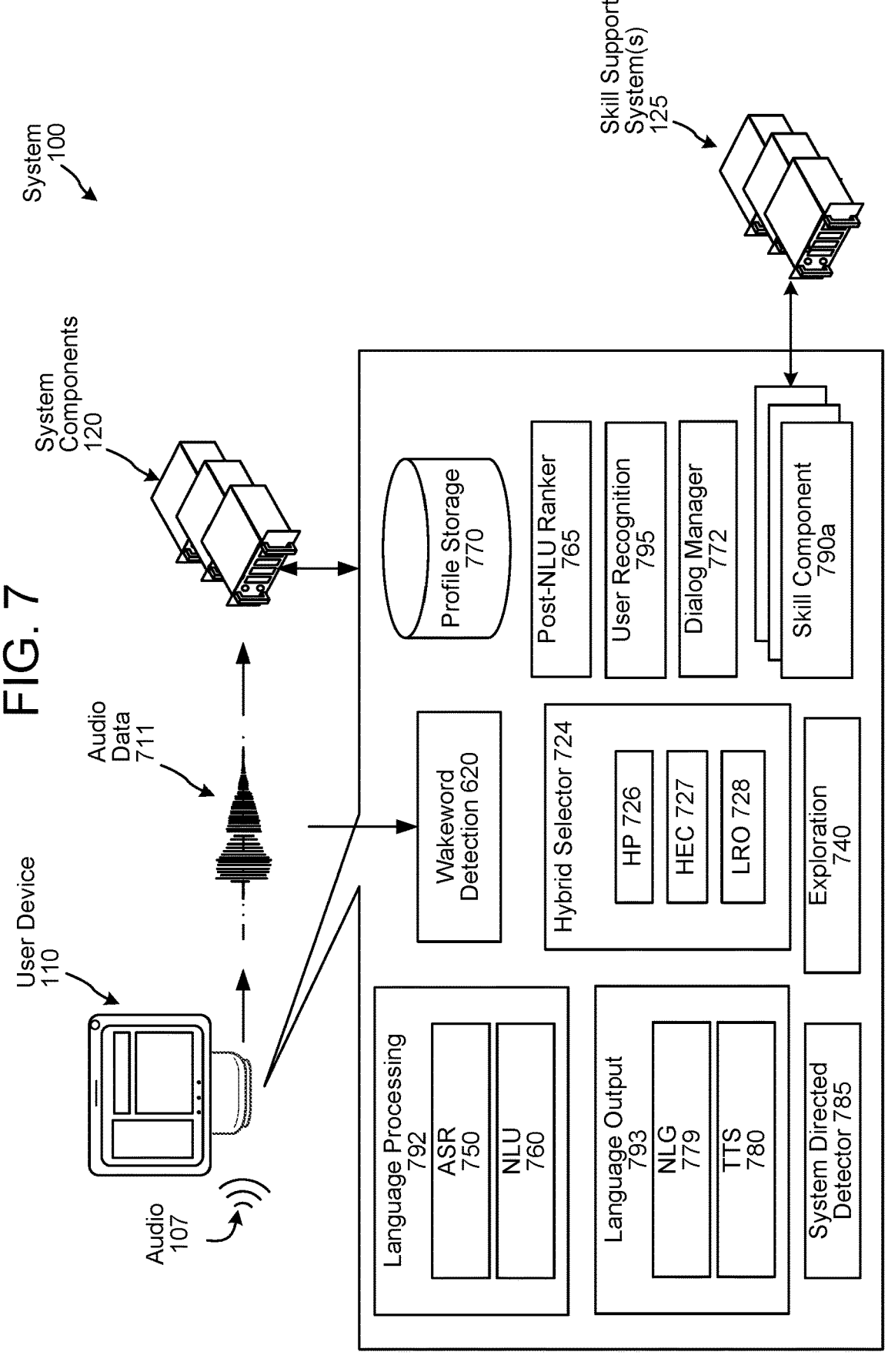
FIG. 7 is a conceptual diagram illustrating components that may be included in a device, according to embodiments of the present disclosure.

In some embodiments, the feedback classifier 144 may attribute user feedback to any of the components of the system 100, including the wakeword detection component 620, the components shown in FIG. 7, etc.

In some embodiments, the exploration storage 142 may also store data indicative of a fallback action for the hypothesis being explored. The hypothesis for the fallback action may be provided by the exploring component. The fallback action hypothesis may be, in some cases, a hypothesis with a certain confidence value.

As illustration, for the example described in relation to FIGS. 1A-1B, example exploration data 302a may be:

Session identifier: first session id
Exploring component: ASR component
Exploring hypothesis: first ASR hypothesis
Exploring variable: "utterance"
Exclusive exploration: YES
Fallback Action: second ASR hypothesis
Defect score: [defect score]

FIG. 4 illustrates example training data 402 that may be stored at the training data storage 149. Example training data 402a for an individual exploration session may include a session identifier (e.g., the dialog session id for the instant dialog session); component, which indicates the component that the user feedback corresponds to; exploring hypothesis, which indicates the hypothesis being explored (e.g., may be the same as the exploring hypothesis stored in the exploration data storage 142); feedback, which may represented the user feedback received during the dialog session; feedback type, which may indicate whether the user feedback is negative, positive or neutral; and feedback context, which may represent additional information related to the user feedback (e.g., device type, manner in which user feedback is provided, solicited vs. unsolicited feedback, etc.). The feedback field may store the user feedback as text data, ASR data, NLU data, or another type of data. The training data 402 may be stored by the feedback classifier 144 based on processing user feedback received during the instant dialog session.

FIG. 5 is a flowchart illustrating an example process that may be performed when the NLU component 160 is testing a hypothesis. The system 100 may receive user input data representing a natural language input from the user 105 that may be a spoken input or a typed input. In some embodiments, other types of inputs, such as, gestures, selections of GUI elements, etc., may be transformed to a natural language input. In case the user input is a spoken input, at a step 502, the ASR component 150 may determine ASR data corresponding to a spoken user input for a dialog session. The ASR data may be associated with a session identifier for the instant dialog session. At a step 504, the NLU component 160 may determine NLU data corresponding to user input data, where the NLU data may include at least a first NLU hypothesis and a second NLU hypothesis. When the user input is a spoken input, the NLU data may be determined using the ASR data. In case where the user input is a non-spoken input, then the NLU data may be determined using a textual or tokenized representation of the natural language input.

At a step 506, the NLU component 160 may select the first NLU hypothesis for testing. In example embodiments, the NLU component 160 may determine to explore a NLU hypothesis based on NLU confidence values corresponding to one or more NLU hypotheses, determined based on the ASR data, satisfying a condition (e.g., the top scoring NLU confidence values are similar; a NLU confidence value satisfies a threshold value; etc.). In other example embodiments, the NLU component 160 may determine to explore the first NLU hypothesis based on the corresponding first NLU confidence value satisfying a condition (e.g., the first confidence value does not satisfy a threshold value and is the top hypothesis of a N-best list; the first confidence value satisfies a threshold value and the component wants further user feedback to learn; etc.). In other example embodiments, the NLU component 160 may select the first NLU hypothesis to explore based on determining that additional data (e.g., user feedback, downstream component processing information, etc.) corresponding to the hypothesis is to be collected. In yet other example embodiments, the NLU component 160 may select the first NLU hypothesis to explore based on corresponding context data (e.g., time of day, location, etc. associated with the user input, device type of the user device 110, etc.).

To initiate an exploration session, at a step 508, the NLU component 160 may store exploration data (e.g., exploration data 302b) indicative of the NLU component 160 testing the first NLU hypothesis for the dialog session. As described herein with relation to FIG. 3, the exploration data 302b may include certain information and in this example may be:

Session identifier: second session id (associated with the instant dialog session)

Exploring component: NLU component

Exploring hypothesis: first NLU hypothesis

Exploring variable: "intent"

Exclusive exploration: YES

Fallback Action: second NLU hypothesis

Defect score: [defect score]

The NLU component 160 may determine which variable, from intent, entity and domain, that it is exploring. For example, the first NLU hypothesis and the second NLU hypothesis may have similar NLU confidence values but may correspond to different intents, in which case, the NLU component 160 may store data indicative of "intent" variable being explored. As another example, the first NLU hypothesis and the second NLU hypothesis may have similar NLU confidence values but may correspond to different domains, in which case, the NLU component 160 may store data indicative of "domain" variable being explored. As yet another example, the first NLU hypothesis and the second NLU hypothesis may correspond to the same intent and the same domain, but may include a different entity, in which case, the NLU component 160 may store data indicative of "entity" variable being explored.

The NLU component 160 may send NLU data to the orchestrator component 130 indicative of the NLU component 160 testing the first NLU hypothesis. In some embodiments, the NLU data may only include the first NLU hypothesis. In other embodiments, the NLU data may include a N-best list of NLU hypotheses with an indication that the first NLU hypothesis is being explored. In yet other embodiments, the NLU component 160 may re-rank an initial N-best list so that the updated/re-ranked N-best list includes the first/exploring hypothesis as the first in the list, causing other system component(s) 120, for example the orchestrator component 130, the post-NLU ranker 165, etc., to select the first/exploring NLU hypothesis for further processing. The orchestrator component 130 may send the NLU data to other system component(s) 120, such as the post-NLU ranker 165, which may process with respect to the first NLU hypothesis based on the NLU data indicative of the NLU component 160 exploring the first NLU hypothesis.

At a step 510, the system component(s) 120 may receive a subsequent user input during the dialog session, where the subsequent user input represents user feedback for the dialog session. The system component(s) 120 may perform processing using the first NLU hypothesis to generate output data responsive to the spoken user input. The subsequent user input may be received after the output data is presented, and may be associated with the session identifier for the instant dialog session. The received user feedback may be processed by one or more of the system component(s) 120. At a step 512, the feedback classifier 144 may process the user feedback to attribute it to a system component, as described above. In this example, the user feedback may be attributed to the NLU component 160 based on the exploration data stored at the exploration storage 142.

In some embodiments, as described herein, based on the NLU component 160 performing an exclusive exploration session, the post-NLU ranker 165 may be prevented from selecting a different NLU hypothesis than the first NLU hypothesis being explored.

In some embodiments, the conversation evaluator 146 may determine defect data corresponding to the instant spoken user input. As described above in relation to FIG. 2, the conversation evaluator 146 may process dialog data of the instant dialog session to determine the defect data, and the defect data may be stored in the exploration storage 142. The guardrails component 148 may update the fallback action based on the defect data, as described above in relation to FIG. 2. For example, the guardrails component 148 may determine that the second NLU hypothesis is to be used in future dialog sessions when the NLU component 160 attempts to explore the first NLU hypothesis.

In some embodiments, a system component 120 may explore a hypothesis of another system component 120. For example, the NLU component 160 may explore an ASR hypothesis from a N-best list of ASR hypotheses determined by the ASR component 150. In such examples, the NLU component 160 may store exploration data 302 indicative of the NLU component exploring a hypothesis where the variable is "utterance." In other examples, the orchestrator component 130 may explore a hypothesis determined by the system component 120, and may store exploration data 302 accordingly.

In a manner similar to the one described in relation to FIGS. 1A, 1B and 5, other system component(s) 120 may also perform exploration steps. In example embodiments, the post-NLU ranker 165 may explore a hypothesis relating to skill selection. For example, the post-NLU ranker 165 may determine that a first skill component 190a and a second skill component 190b may be capable of responding to a user input, and the post-NLU ranker 165 may select the first skill component 190a to explore. The post-NLU ranker 165 may store exploration data, as described herein, to initiate such an exploration session. User feedback received during this instant dialog session may be attributed to the post-NLU ranker 165 and may be later used by the post-NLU ranker 165 to update (e.g., retrain) one or more components of the post-NLU ranker 165.

In example embodiments, the TTS component 180 may explore a hypothesis relating to a type of response presented to the user 105. For example, the TTS component 180 may determine that a system response may be presented as a "long" response or as a "brief" response. A brief response may involve fewer words than a long response. For example, a brief response may be "yes, I have started a timer" while a long response may be "I have started a timer for 10 minutes. Would you like me to perform any other actions?" As another example, a brief response may be "it is sunny today" while a long response may be "it is sunny today with a high temperature of _ and low temperature of _."

In example embodiments, the alternative input representation component 162 may explore a hypothesis relating to an alternative input representation determined for a user input. For example, the alternative input representation component 162 may determine a first alternative input representation and a second alternative input representation both having similar confidence values, and may select the first alternative input representation to explore. The alternative input representation component 162 may store exploration data, as described herein, to initiate such an exploration session. User feedback received during the dialog session may be attributed to the alternative input representation component 162. In some embodiments, when the alternative input representation component 162 is performing an exclusive exploration session the NLU component 160 may generate NLU data including the first alternative input representation being explored, and the post-NLU ranker 165 may not select a different NLU hypothesis to enable user feedback to be collected with respect to the first alternative input representation.

Although above describes a system component performing exploration or testing of a hypothesis, it should be understood that the system component(s) 120 may explore or test a component output that is determined based on processing some input provided to the system component. A system component 120 may process data relating to a user input and may determine more than one outputs (referred to as component output data) based on the processing of the data. For example, the skill component 190a may determine two options (e.g., first skill output data and second skill output data) for responding to a user input based on the NLU data provided to the skill component 190a, and the skill component 190a may perform steps (as described herein) to test one of the first skill output data or the second skill output data.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/system component(s) 120. In at least some embodiments, such determination may be made using a wakeword detection component 620.

The wakeword detection component 620 may process the audio data, representing the audio 107, to determine whether speech is represented therein. The user device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword. Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech can include other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620, the user device 110 may "wake" and begin transmitting audio data 611/711 (shown in FIGS. 4 and 5), representing the audio 107, to the system component(s) 120. The audio data 611 may include data corresponding to the wakeword.

The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc. The device 110 may also capture images using camera(s) 618 of the device 110 and may send image data 621 representing those image(s) to the system component(s) 120. The image data 621 may include raw image data or image data processed by the device 110 before sending to the system component(s) 120. The image data 621 may be used in various manners by different components of the system to perform operations such as determining whether a user is directing an utterance to the system, interpreting a user command, responding to a user command, etc.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Once the wakeword is detected by the wakeword detection component 620 and/or input is detected by an input detector, the device 110 may "wake" and begin transmitting audio data 611, representing the audio 107, to the system component(s) 120. The audio data 611 may include data corresponding to the wakeword; in other embodiments, the portion of the audio corresponding to the wakeword is removed by the device 110 prior to sending the audio data 611 to the system component(s) 120. In the case of touch input detection- or gesture-based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 620 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 190 of one or more system components 120.

The system component(s) 120 may include a system directed input detector 685. The system directed input detector 685 may be configured to determine whether an input to the system (for example speech, a gesture, etc.) is directed to the system or not directed to the system (for example directed to another user, etc.). The system directed input detector 685 may work in conjunction with the wakeword detector 620. If the system directed input detector 685 determines an input is directed to the system, the device 110 may "wake" and begin sending captured data for further processing (for example, processing audio data using the language processing 692/792, processing captured image data 621, or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input, and may output a green indicator if a system directed input is detected. Other such configurations are possible.

Upon receipt by the system component(s) 120, the audio data 611 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 611 to a language processing component 692. The language processing component 692 (sometimes also referred to as a spoken language understanding (SLU) component) includes an automatic speech recognition (ASR) component 150 and a natural language understanding (NLU) component 160. The ASR component 150 may transcribe the audio data 611 into text data, tokenized data or other word representation data. The ASR data output by the ASR component 150 represents one or more than one (e.g., in the form of an N-best list) ASR hypotheses representing speech represented in the audio data 611.

In some embodiments, the ASR component 150 interprets the speech in the audio data 611 based on a similarity between the audio data 611 and pre-established language models. For example, the ASR component 150 may compare the audio data 611 with models for sounds (e.g., acoustic units such as phonemes, senons, phones, etc.) and sequences of sounds to identify words that match the sequence of sounds of the speech represented in the audio data 611. In some embodiments, the ASR component 150 may use one or more machine learning models, for example, neural network models, RNN models, RNN-T models, etc. The ASR component 150 sends the ASR data generated thereby to an NLU component 160, via, in some embodiments, the orchestrator component 130. The ASR data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein.

The speech processing system 692 may further include a NLU component 160. The NLU component 160 may receive the ASR data from the ASR component 150. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill support system(s) 125, etc.) to execute the intent. For example, if the ASR data corresponds to "play the 5th Symphony by Beethoven," the NLU component 160 may determine an intent that the system output music and may identify "Beethoven" as an artist/composer and "5th Symphony" as the piece of music to be played. For further example, if the ASR data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user 105. However, if the NLU component 160 is unable to resolve the entity—for example, because the entity is referred to by anaphora such as "this song" or "my next appointment"— the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 160 may return NLU results data (which may include tagged text data, indicators of intent, etc.) back to the orchestrator component 130. The orchestrator component 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 165 which may incorporate other information to rank potential interpretations determined by the NLU component 160. The local device 110 may also include its own post-NLU ranker 765, which may operate similarly to the post-NLU ranker 165.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator component 130.

The post-NLU ranker 165 may include a statistical component that produces a ranked list of intent/skill pairs with associated confidence scores. Each confidence score may indicate an adequacy of the skill's execution of the intent with respect to NLU results data associated with the skill. The post-NLU ranker 165 may operate one or more trained models configured to process the NLU results data, skill result data, and the other data in order to output ranked output data. The ranked output data may include an n-best list where the NLU hypotheses in the NLU results data are reordered such that the n-best list in the ranked output data represents a prioritized list of skills to respond to a user input as determined by the post-NLU ranker 165. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 165 enables the system to better determine the best skill to execute the user input. For example, first and second NLU hypotheses in the NLU results data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 165 (or other scheduling component such as orchestrator component 130) may solicit the first skill and the second skill to provide potential result data based on the first NLU hypothesis and the second NLU hypothesis, respectively. For example, the post-NLU ranker 165 may send the first NLU hypothesis to the first skill 190*a* along with a request for the first skill 190*a* to at least partially execute with respect to the first NLU hypothesis. The post-NLU ranker 165 may also send the second NLU hypothesis to the second skill 190*b* along with a request for the second skill 190*b* to at least partially execute with respect to the second NLU hypothesis. The post-NLU ranker 165 receives, from the first skill 190*a*, first result data generated from the first skill 190*a*'s execution with respect to the first NLU hypothesis. The post-NLU ranker 165 also receives, from the second skill 190*b*, second results data generated from the second skill 190*b*'s execution with respect to the second NLU hypothesis.

The post-NLU ranker 165 may consider the first skill result data and the second skill result data to alter the first confidence score and the second confidence score of the first NLU hypothesis and the second NLU hypothesis, respectively. That is, the post-NLU ranker 165 may generate a third confidence score based on the first result data and the first confidence score. The third confidence score may correspond to how likely the post-NLU ranker 165 determines the first skill will correctly respond to the user input. The post-NLU ranker 165 may also generate a fourth confidence score based on the second result data and the second confidence score. One skilled in the art will appreciate that a first difference between the third confidence score and the fourth confidence score may be greater than a second difference between the first confidence score and the second confidence score. The post-NLU ranker 165 may also consider the other data to generate the third confidence score and the fourth confidence score. While it has been described that the post-NLU ranker 165 may alter the confidence scores associated with first and second NLU hypotheses, one skilled in the art will appreciate that the post-NLU ranker 165 may alter the confidence scores of more than two NLU hypotheses. The post-NLU ranker 165 may select the result data associated with the skill 190 with the highest altered confidence score to be the data output in response to the current user input. The post-NLU ranker 165 may also consider the ASR output data to alter the NLU hypotheses confidence scores.

The orchestrator component 130 may, prior to sending the NLU results data to the post-NLU ranker 165, associate intents in the NLU hypotheses with skills 190. For example, if a NLU hypothesis includes a <PlayMusic> intent, the orchestrator component 130 may associate the NLU hypothesis with one or more skills 190 that can execute the <PlayMusic> intent. Thus, the orchestrator component 130 may send the NLU results data, including NLU hypotheses paired with skills 190, to the post-NLU ranker 165. In response to ASR output data corresponding to "what should I do for dinner today," the orchestrator component 130 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 165 queries each skill 190, paired with a NLU hypothesis in the NLU output data, to provide skill result data based on the NLU hypothesis with which it is associated. That is, with respect to each skill, the post-NLU ranker 165 colloquially asks each skill "if given this NLU hypothesis, what would you do with it." According to the above example, the post-NLU ranker 165 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 165 may query each of the skills 190 in parallel or substantially in parallel.

A skill 190 may provide the post-NLU ranker 165 with various data and indications in response to the post-NLU ranker 165 soliciting the skill 190 for result data. A skill 190 may simply provide the post-NLU ranker 165 with an indication of whether or not the skill can execute with respect to the NLU hypothesis it received. A skill 190 may also or alternatively provide the post-NLU ranker 165 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 165 with result data indicating slots of a framework that the skill 190 further needs filled or entities that the skill 190 further needs resolved prior to the skill 190 being able to provided result data responsive to the user input. The skill 190 may also provide the post-NLU ranker 165 with an instruction and/or computer-generated speech indicating how the skill 190 recommends the system solicit further information needed by the skill 190. The skill 190 may further provide the post-NLU ranker 165 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 165 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator The post-NLU ranker 165 uses the result data provided by the skills 190 to alter the NLU confidence scores. That is, the post-NLU ranker 165 uses the result data provided by the queried skills 190 to create larger differences between the NLU confidence scores generated by the NLU component 160. Without the post-NLU ranker 165, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 165, the system may not be able to determine whether to obtain output data from a general reference information skill or a medical information skill in response to a user input corresponding to "what is acne."

The post-NLU ranker 165 may prefer skills 190 that provide result data responsive to NLU hypotheses over skills 190 that provide result data corresponding to an indication that further information is needed, as well as skills 190 that provide result data indicating they can provide multiple responses to received NLU hypotheses. For example, the post-NLU ranker 165 may generate a first score for a first skill 190a that is greater than the first skill's NLU confidence score based on the first skill 190a providing result data including a response to a NLU hypothesis. For further example, the post-NLU ranker 165 may generate a second score for a second skill 190b that is less than the second skill's NLU confidence score based on the second skill 190b providing result data indicating further information is needed for the second skill 190b to provide a response to a NLU hypothesis. Yet further, for example, the post-NLU ranker 165 may generate a third score for a third skill 190c that is less than the third skill's NLU confidence score based on the third skill 190c providing result data indicating the third skill 190c can provide multiple responses to a NLU hypothesis.

The post-NLU ranker 165 may consider other data in determining scores. The other data may include rankings associated with the queried skills 190. A ranking may be a system ranking or a user-specific ranking. A ranking may indicate a veracity of a skill from the perspective of one or more users of the system. For example, the post-NLU ranker 165 may generate a first score for a first skill 190a that is greater than the first skill's NLU processing confidence score based on the first skill 190a being associated with a high ranking. For further example, the post-NLU ranker 165 may generate a second score for a second skill 190b that is less than the second skill's NLU processing confidence score based on the second skill 190b being associated with a low ranking.

The other data may include information indicating whether or not the user that originated the user input has enabled one or more of the queried skills 190. For example, the post-NLU ranker 165 may generate a first score for a first skill 190a that is greater than the first skill's NLU processing confidence score based on the first skill 190a being enabled by the user that originated the user input. For further example, the post-NLU ranker 165 may generate a second score for a second skill 190b that is less than the second skill's NLU processing confidence score based on the second skill 190b not being enabled by the user that originated the user input. When the post-NLU ranker 165 receives the NLU results data, the post-NLU ranker 165 may determine whether profile data, associated with the user and/or device that originated the user input, includes indications of enabled skills.

The other data may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 165 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 165 may increase the NLU processing confidence score associated with a first skill configured to output visual data and/or decrease the NLU processing confidence score associated with a second skill configured to output audio data.

The other data may include information indicating the type of device that originated the user input. For example, the device may correspond to a "hotel room" type if the device is located in a hotel room. If a user inputs a command corresponding to "order me food" to the device located in the hotel room, the post-NLU ranker 165 may increase the NLU processing confidence score associated with a first skill 190a corresponding to a room service skill associated with the hotel and/or decrease the NLU processing confidence score associated with a second skill 190b corresponding to a food skill not associated with the hotel.

The other data may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 165 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 165 may increase the NLU processing confidence score associated with the second skill 190b and/or decrease the NLU processing confidence score associated with the first skill 190a.

The other data may include information indicating a time of day. The system may be configured with skills 190 that operate with respect to certain times of day. For example, a user may provide a user input corresponding to "order me food." A first skill 190a may generate first result data corresponding to breakfast. A second skill 190b may generate second result data corresponding to dinner. If the system(s) 120 receives the user input in the morning, the post-NLU ranker 165 may increase the NLU processing confidence score associated with the first skill 190a and/or decrease the NLU processing score associated with the second skill 190b. If the system(s) 120 receives the user input in the afternoon or evening, the post-NLU ranker 165 may increase the NLU processing confidence score associated with the second skill 190b and/or decrease the NLU processing confidence score associated with the first skill 190a.

The other data may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 670) that is associated with the user that provided the user input to the system components(s) 120 as well as indicates the user prefers the first skill 190a over the second skill 190b. Thus, when the user provides a user input that may be executed by both the first skill 190a and the second skill 190b, the post-NLU ranker 165 may increase the NLU processing confidence score associated with the first skill 190*a* and/or decrease the NLU processing confidence score associated with the second skill 190*b*.

The other data may include information indicating system usage history associated with the user that originated the user input. For example, the system usage history may indicate the user originates user inputs that invoke a first skill 190*a* more often than the user originates user inputs that invoke a second skill 190*b*. Based on this, if the present user input may be executed by both the first skill 190*a* and the second skill 190*b*, the post-NLU ranker 165 may increase the NLU processing confidence score associated with the first skill 190*a* and/or decrease the NLU processing confidence score associated with the second skill 190*b*.

It has been described that the post-NLU ranker 165 uses the other data to increase and decrease NLU confidence scores associated with various skills 190 that the post-NLU ranker 165 has already requested result data from. Alternatively, the post-NLU ranker 165 may use the other data to determine which skills 190 to request result data from. For example, the post-NLU ranker 165 may use the other data to increase and/or decrease NLU processing confidence scores associated with skills 190 associated with the NLU results data output by the NLU component 160. The post-NLU ranker 165 may select n-number of top scoring altered NLU processing confidence scores. The post-NLU ranker 165 may then request result data from only the skills 190 associated with the selected n-number of NLU processing confidence scores.

As described, the post-NLU ranker 165 queries multiple skills associated with the NLU results data to provide result data to the post-NLU ranker 165 prior to the post-NLU ranker 165 ultimately determining the skill 190 to be invoked to respond to the user input. Some of the skills 190 may provide result data indicating responses to NLU hypotheses while other skills 190 may providing result data indicating the skills cannot provide responsive data. Whereas a system not implementing the post-NLU ranker 165 may select one of the skills 190 that could not provide a response, the post-NLU ranker 165 only selects a skill 190 that provides the post-NLU ranker 165 with result data corresponding to a response, indicating further information is needed, or indicating multiple responses can be generated.

The post-NLU ranker 165 may select result data, associated with the skill 190 associated with the highest score, for output to the user. Alternatively, the post-NLU ranker 165 may output ranked output data indicating skills 190 and their respective post-NLU ranker rankings. Since the post-NLU ranker 165 receives result data, potentially corresponding to a response to the user input, from the skills 190 prior to post-NLU ranker 165 selecting one of the skills or outputting the ranked output data, little to no latency occurs from the time skills provide result data and the time the system outputs responds to the user.

If the post-NLU ranker 165 selects result audio data to be output to a user and the system determines content should be output audibly, the post-NLU ranker 165 (or another component of the system(s) 120) may cause the device 110*a* and/or the device 110*b* to output audio corresponding to the result audio data. If the post-NLU ranker 165 selects result text data to output to a user and the system determines content should be output visually, the post-NLU ranker 165 (or another component of the system(s) 120) may cause the device 110*b* to display text corresponding to the result text data. If the post-NLU ranker 165 selects result audio data to output to a user and the system determines content should be output visually, the post-NLU ranker 165 (or another component of the system(s) 120) may send the result audio data to the ASR component 150. The ASR component 150 may generate output text data corresponding to the result audio data. The system(s) 120 may then cause the device 110*b* to display text corresponding to the output text data. If the post-NLU ranker 165 selects result text data to output to a user and the system determines content should be output audibly, the post-NLU ranker 165 (or another component of the system(s) 120) may send the result text data to the TTS component 180. The TTS component 180 may generate output audio data (corresponding to computer-generated speech) based on the result text data. The system(s) 120 may then cause the device 110*a* and/or the device 110*b* to output audio corresponding to the output audio data.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 672 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 672 may associate a dialog session identifier with the dialog upon identifying that the user is engaging in a dialog with the user. The dialog manager component 672 may track a user input and the corresponding system generated response to the user input as a turn. The dialog session identifier may correspond to multiple turns of user input and corresponding system generated response. The dialog manager component 672 may transmit data identified by the dialog session identifier directly to the orchestrator component 130 or other component. Depending on system configuration the dialog manager 672 may determine the appropriate system generated response to give to a particular utterance or user input of a turn. Or creation of the system generated response may be managed by another component of the system (e.g., the language output component 693, NLG 679, orchestrator component 130, etc.) while the dialog manager 672 selects the appropriate responses. Alternatively, another component of the system component(s) 120 may select responses using techniques discussed herein. The text of a system generated response may be sent to a TTS component 180 for creation of audio data corresponding to the response. The audio data may then be sent to a user device (e.g., device 110) for ultimate output to the user. Alternatively (or in addition) a dialog response may be returned in text or some other form.

The dialog manager 672 may receive the ASR hypothesis/hypotheses (i.e., text data) and make a semantic interpretation of the phrase(s) or statement(s) represented therein. That is, the dialog manager 672 determines one or more meanings associated with the phrase(s) or statement(s) represented in the text data based on words represented in the text data. The dialog manager 672 determines a goal corresponding to an action that a user desires be performed as well as pieces of the text data that allow a device (e.g., the device 110, the system component(s) 120, a skill 190, a skill support system(s) 125, etc.) to execute the intent. If, for example, the text data corresponds to "what is the weather," the dialog manager 672 may determine that that the system component(s) 120 is to output weather information associated with a geographic location of the device 110. In another example, if the text data corresponds to "turn off the lights," the dialog manager 672 may determine that the system component(s) 120 is to turn off lights associated with the device(s) 110 or the user(s) 105.

The dialog manager 672 may send the results data to one or more skill component(s) 190. If the results data includes a single hypothesis, the orchestrator component 130 may send the results data to the skill component(s) 190 associated with the hypothesis. If the results data includes an N-best list of hypotheses, the orchestrator component 130 may send the top scoring hypothesis to a skill component(s) 190 associated with the top scoring hypothesis.

The system component(s) 120 includes a language output component 693. The language output component 693 includes a natural language generation (NLG) component 679 and a text-to-speech (TTS) component 180. The NLG component 679 can generate text for purposes of TTS output to a user. For example the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 180. Alternatively or in addition, the TTS component 180 may receive text data from a skill component 190 or other system component for output.

The NLG component 679 may include a trained model. The NLG component 679 generates text data (or other natural language representation data) from dialog data received by the dialog manager 672 such that the output text data has a natural feel and, in some embodiments, includes words and/or phrases specifically formatted for a requesting individual. The NLG component 679 may use templates to formulate responses, and/or the NLG component 679 may include models trained from the various templates for forming the output text data. For example, the NLG component 679 may analyze transcripts of local news programs, television shows, sporting events, or any other media program to obtain common components of a relevant language and/or region. As one illustrative example, the NLG component 679 may analyze a transcription of a regional sports program to determine commonly used words or phrases for describing scores or other sporting news for a particular region. The NLG component 679 may further receive, as inputs, a dialog history, an indicator of a level of formality, and/or a command history or other user history such as the dialog history.

The NLG component 679 may generate dialog data based on one or more response templates. Further continuing the example above, the NLG component 679 may select a template in response to the question, "What is the weather currently like?" of the form: "The weather currently is $weather_information$." The NLG component 679 may analyze the logical form of the template to produce one or more textual responses including markups and annotations to familiarize the response that is generated. In some embodiments, the NLG component 679 may determine which response is the most appropriate response to be selected. The selection may, therefore, be based on past responses, past questions, a level of formality, and/or any other feature, or any other combination thereof. Responsive audio data representing the response generated by the NLG component 679 may then be generated using the text-to-speech component 180.

The TTS component 180 may generate audio data (e.g., synthesized speech) from text data using one or more different methods. Text data input to the TTS component 180 may come from a skill component 190, the orchestrator component 130, or another component of the system. In one method of synthesis called unit selection, the TTS component 180 matches text data against a database of recorded speech. The TTS component 180 selects matching units of recorded speech and concatenates the units together to form audio data. In another method of synthesis called parametric synthesis, the TTS component 180 varies parameters such as frequency, volume, and noise to create audio data including an artificial speech waveform. Parametric synthesis uses a computerized voice generator, sometimes called a vocoder.

The device 110 may include image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 611 representing the commands to the system component(s) 120 for processing, after which the system component(s) 120 may return output data that can cause the device 110 to engage its camera.

Upon receipt by the system component(s) 120, the image data 621 may be sent to an orchestrator component 130. The orchestrator component 130 may send the image data 621 to an image processing component that can perform computer vision functions such as object recognition, modeling, reconstruction, etc. For example, the image processing component may detect a person, face, etc. (which may then be identified using user recognition component 695). The device 110 may also include its own image processing component.

In some implementations, the image processing component can detect the presence of text in an image. In such implementations, the image processing component can recognize the presence of text, convert the image data to text data, and send the resulting text data via the orchestrator component 130 to the language processing component 692 for processing by the NLU component 160.

The system component(s) 120 may include a user recognition component 695 that recognizes one or more users using a variety of data. However, the disclosure is not limited thereto, and the device 110 may include a user recognition component 795 instead of and/or in addition to user recognition component 695 of the system component(s) 120 without departing from the disclosure. User recognition component 795 operates similarly to user recognition component 695.

The user-recognition component 695 may take as input the audio data 611 and/or text data output by the ASR component 150. The user-recognition component 695 may perform user recognition by comparing audio characteristics in the audio data 611 to stored audio characteristics of users. The user-recognition component 695 may also perform user recognition by comparing biometric data (e.g., fingerprint data, iris data, etc.), received by the system in correlation with the present user input, to stored biometric data of users assuming user permission and previous authorization. The user-recognition component 695 may further perform user recognition by comparing image data (e.g., including a representation of at least a feature of a user), received by the system in correlation with the present user input, with stored image data including representations of features of different users. The user-recognition component 695 may perform additional user recognition processes, including those known in the art.

The user-recognition component 695 determines scores indicating whether user input originated from a particular user. For example, a first score may indicate a likelihood that the user input originated from a first user, a second score may indicate a likelihood that the user input originated from a second user, etc. The user-recognition component 695 also determines an overall confidence regarding the accuracy of user recognition operations.

Output of the user-recognition component 695 may include a single user identifier corresponding to the most likely user that originated the user input. Alternatively, output of the user-recognition component 695 may include an N-best list of user identifiers with respective scores indicating likelihoods of respective users originating the user input. The output of the user-recognition component 695 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 6 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 7 illustrates such a configured user device 110.

In at least some embodiments, the system component(s) 120 may receive the audio data 611 from the device 110, to recognize speech corresponding to a spoken input in the received audio data 611, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

The device 110 may include a wakeword detection component 620 configured to compare the audio data 611 to stored models used to detect a wakeword (e.g., "Alexa") that indicates to the device 110 that the audio data 611 is to be processed for determining NLU output data (e.g., slot data that corresponds to a named entity, label data, and/or intent data, etc.). In at least some embodiments, a hybrid selector 724, of the device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system component(s) 620 and/or the ASR component 750. The wakeword detection component 620 may also send an indication, to the hybrid selector 724, representing a wakeword was not detected. In response to receiving such an indication, the hybrid selector 724 may refrain from sending the audio data 611 to the system component(s) 120, and may prevent the ASR component 750 from further processing the audio data 611. In this situation, the audio data 611 can be discarded.

The device 110 may conduct its own speech processing using on-device language processing components, such as an SLU/language processing component 792 (which may include an ASR component 750 and an NLU 760), similar to the manner discussed herein with respect to the SLU component 692 (or ASR component 150 and the NLU component 160) of the system component(s) 120. Language processing component 792 may operate similarly to language processing component 692, ASR component 750 may operate similarly to ASR component 150 and NLU component 760 may operate similarly to NLU component 160. The device 110 may also internally include, or otherwise have access to, other components such as one or more skill components 790 capable of executing commands based on NLU output data or other results determined by the device 110/system component(s) 120 (which may operate similarly to skill components 190), a user recognition component 795 (configured to process in a similar manner to that discussed herein with respect to the user recognition component 695 of the system component(s) 120), profile storage 770 (configured to store similar profile data to that discussed herein with respect to the profile storage 670 of the system component(s) 120), a dialog manager 772 (configured to process in a similar manner as the dialog manager 672 of the system component(s) 120), an exploration component 740 (configured to process in a similar manner as the exploration component 140 of the system component(s) 120), or other components. In at least some embodiments, the profile storage 770 may only store profile data for a user or group of users specifically associated with the device 110. Similar to as described above with respect to skill component 190, a skill component 790 may communicate with a skill support system(s) 125. The device 110 may also have its own language output component 793 which may include NLG component 779 and TTS component 780. Language output component 793 may operate similarly to language processing component 693, NLG component 779 may operate similarly to NLG component 679 and TTS component 780 may operate similarly to TTS component 180.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 724, of the device 110, may include a hybrid proxy (HP) 726 configured to proxy traffic to/from the system component(s) 120. For example, the HP 726 may be configured to send messages to/from a hybrid execution controller (HEC) 727 of the hybrid selector 724. For example, command/directive data received from the system component(s) 120 can be sent to the HEC 727 using the HP 726. The HP 726 may also be configured to allow the audio data 711 to pass to the system component(s) 120 while also receiving (e.g., intercepting) this audio data 711 and sending the audio data 711 to the HEC 727.

In at least some embodiments, the hybrid selector 724 may further include a local request orchestrator (LRO) 728 configured to notify the ASR component 750 about the availability of new audio data 711 that represents user speech, and to otherwise initiate the operations of local language processing when new audio data 711 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 711 is received, the HP 726 may allow the audio data 711 to pass through to the system component(s) 120 and the HP 726 may also input the audio data 711 to the on-device ASR component 750 by routing the audio data 711 through the HEC 727 of the hybrid selector 724, whereby the LRO 728 notifies the ASR component 750 of the audio data 711. At this point, the hybrid selector 724 may wait for response data from either or both of the system component(s) 120 or the local language processing components. However, the disclosure is not limited thereto, and in some examples the hybrid selector 724 may send the audio data 711 only to the local ASR component 750 without departing from the disclosure. For example, the device 110 may process the audio data 711 locally without sending the audio data 711 to the system component(s) 120.

The local ASR component 750 is configured to receive the audio data 711 from the hybrid selector 724, and to recognize speech in the audio data 711, and the local NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 711 to the system component(s) 120, and the response data from the system component(s) 120 may include the unique identifier to identify which natural language user input the response data corresponds.

In at least some embodiments, the device 110 may include, or be configured to use, one or more skill components 790 that may work similarly to the skill component(s) 190 implemented by the system component(s) 120. The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

A "domain" may include various skills relating to a particular area of interest. For example, a music domain may include various skills that can respond to a user's request to play music, enable a user to purchase music, etc. In another example, a smart-home domain may include skills that enable a user to control various home devices. A domain may correspond to different intents and entities. For example, the music domain may correspond to a Play Music intent, Add to Playlist intent, etc. As another example, the smart-home domain may correspond to Turn On intent, Turn Off intent, etc.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 790, a skill system 125, or a combination of a skill component 790 and a corresponding skill system 125.

Similar to the manner discussed with regard to FIG. 6, the local device 110 may be configured to recognize multiple different wakewords and/or perform different categories of tasks depending on the wakeword. Such different wake-words may invoke different processing components of local device 110 (not illustrated in FIG. 7). For example, detection of the wakeword "Alexa" by the wakeword detection component 620 may result in sending audio data to certain language processing components 792/skills 790 for process-ing while detection of the wakeword "Computer" by the wakeword detector may result in sending audio data differ-ent language processing components 792/skills 790 for processing.

One or more of the herein described system component(s) 120 components may implement one or more trained machine learning models. Various machine learning tech-niques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Sup-port Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recog-nize patterns in the data, and which are commonly used for classification and regression analysis. Given a set of training examples, each marked as belonging to one of two catego-ries, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and lan-guage model processing. In the case where an acoustic model uses a neural network, each node of the neural network input layer may represent an acoustic feature of a feature vector of acoustic features, such as those that may be output after the first pass of performing speech recognition, and each node of the output layer represents a score corre-sponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may deter-mine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorpo-rates some history of words processed by the neural network the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network deter-mines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to deter-mine how the network performance compares to the target performance. Using a training technique, such as back propagation, the weights of the neural network may be updated to reduce errors made by the neural network when processing the training data.

FIG. 8 is a block diagram conceptually illustrating a device 110 that may be used with the system. FIG. 9 is a block diagram conceptually illustrating example compo-nents of a remote device, such as the system component(s) 120, which may assist with ASR processing, NLU process-ing, etc., and the skill support system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform opera-tions discussed herein. The server(s) may be configured to operate using one or more of a client-server model, a computer bureau model, grid computing techniques, fog computing techniques, mainframe techniques, utility com-puting techniques, a peer-to-peer model, sandbox tech-niques, or other computing techniques.

Multiple systems (120/125) may be included in the over-all system of the present disclosure, such as one or more system components 120 for performing ASR processing, one or more system components 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system component(s) 120, or the skill support system(s) 125 may include their own dedicated processors, memory, and/or storage. Alternatively, one or more of the components of the device(s) 110, the system component(s) 120, or the skill support system(s) 125 may utilize the I/O interfaces (802/902), processor(s) (804/904), memory (806/906), and/or storage (808/908) of the device(s) 110 system component(s) 120, or the skill support system(s) 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 125, as described herein, are illustrative, and may be located as a stand-alone device or may be included, in whole or in part, as a component of a larger device or system.

Figure 10:
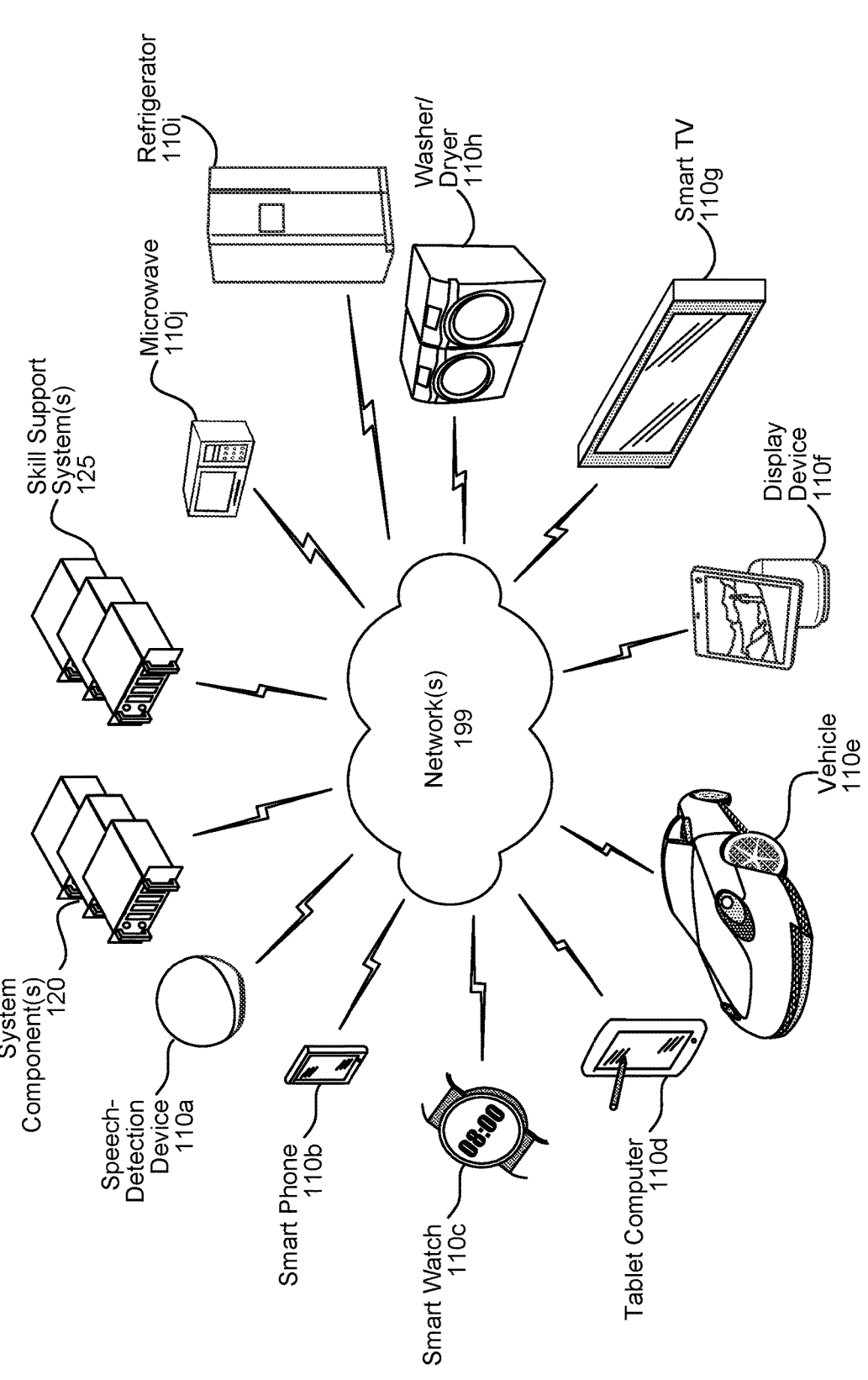
FIG. 10 illustrates an example of a computer network for use with the speech processing system.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first spoken input;
processing the first audio data using an automatic speech recognition (ASR) component to determine a first ASR hypothesis associated with a first confidence value and a second ASR hypothesis associated with a second confidence value;
determining that the first confidence value and the second confidence value satisfy a condition;
based on the first confidence value and the second confidence value satisfying the condition, storing first data indicating the ASR component is testing the second ASR hypothesis, the first data including an identifier associated with the ASR component;

determining, using the second ASR hypothesis, an action to be performed by a system component;
performing the action to determine first output data responsive to the first spoken input;
causing presentation of the first output data;
in response to presentation of the first output data, receiving second audio data representing a second spoken input;
determining that the second spoken input represents first user feedback for the first output data;
determining, based on the first data, that the first user feedback corresponds to the ASR component performing testing of the second ASR hypothesis; and
in response to determining that the first user feedback corresponds to the ASR component performing testing of the second ASR hypothesis, determining first training data based on the second ASR hypothesis and the first user feedback, the first training data to be used to update the ASR component for processing of future spoken inputs.

2. The computer-implemented method of claim 1, further comprising:
determining an alternative input representation corresponding to the first spoken input, wherein the alternative input representation results in a desired response to the first spoken input;
based on the first data, determining natural language understanding (NLU) data corresponding to the second ASR hypothesis instead of the alternative input representation; and
generating the first output data using the NLU data.

3. The computer-implemented method of claim 1, further comprising:
receiving third audio data representing a third spoken input;
processing the third audio data using the ASR component to determine ASR data;
processing the ASR data using a natural language understanding (NLU) component to determine a first NLU hypothesis and a second NLU hypothesis;
generating second data indicating that the NLU component is collecting user feedback regarding the first NLU hypothesis;
based on the second data, using the first NLU hypothesis to generate second output data responsive to the third spoken input;
causing presentation of the second output data;
in response to presentation of the second output data, receiving fourth audio data representing a fourth spoken input;
determining, using the fourth audio data, that the fourth spoken input represents second user feedback for the second output data;
determining, based on the second data, that the second user feedback corresponds to the NLU component testing the first NLU hypothesis; and
in response to determining that the second user feedback corresponds to the NLU component, determining second training data based on the first NLU hypothesis and the second user feedback, the second training data to be used to update the NLU component for processing of future spoken inputs.

4. The computer-implemented method of claim 1, further comprising:
generating second data indicating the first ASR hypothesis is a fallback action;

receiving dialog data representing:
 a prior user input received before the first spoken input during a dialog session including the first spoken input, and
 a prior system response to the prior user input;
 processing the first ASR hypothesis and the dialog data to determine defect data representing a likelihood of the first output data being an undesired response to the first spoken input;
 determining that the defect data satisfies a condition; and
 based on the defect data satisfying the condition, generating third data indicating the first ASR hypothesis is to be selected instead of the second ASR hypothesis.

5. A computer-implemented method comprising:
 receiving first input data corresponding to a first user input to a natural language processing system comprising of a plurality of components;
 determining, using a first component of the plurality of components, a first hypothesis usable to generate a response to the first user input;
 storing first data indicating the first hypothesis is being tested, the first data including an identifier associated with the first component;
 using the first hypothesis and at least a second component of the plurality of components, generating first output data responsive to the first user input;
 causing presentation of the first output data;
 receiving second input data corresponding to first user feedback with respect to the first output data;
 determining, based on the first data, that the first user feedback corresponds to the first component; and
 in response to determining that the first user feedback corresponds to the first component, determining an updated first component based at least on the first hypothesis and the first user feedback.

6. The computer-implemented method of claim 5, wherein the first component is an automatic speech recognition (ASR) component, and the method further comprises:
 determining an alternative input representation corresponding to the first user input; and
 determining, based on the first data, natural language understanding (NLU) data corresponding to the first hypothesis instead of the alternative input representation.

7. The computer-implemented method of claim 5, wherein the first component is a NLU component, and the method further comprises:
 determining, by the second component, a skill component corresponding to the first hypothesis instead of a second hypothesis.

8. The computer-implemented method of claim 5, further comprising:
 generating second data indicating a second hypothesis as a fallback action;
 receiving third input data corresponding to a second user input received prior to the first user input, the second user input being associated with a dialog session including the first user input;
 receiving system response data representing a system response to the second user input;
 processing the first input data, the third input data and the system response data to determine defect data representing a likelihood of the first output data representing an undesired response to the first user input; and
 based on the defect data, generating third data indicating the second hypothesis is to be selected instead of the first hypothesis.

9. The computer-implemented method of claim 5, further comprising:
 receiving third input data corresponding to a second user input to the natural language processing system;
 determining, using the first component, a third hypothesis corresponding to the third input data;
 storing second data indicative of the third hypothesis being tested;
 determining, using the second component, a fourth hypothesis corresponding to the third input data;
 determining second output data using the fourth hypothesis;
 causing presentation of the second output data;
 receiving fourth input data representing second user feedback with respect to the second output data;
 determining, based on the second data and the second output data being determined using the fourth hypothesis, that the second user feedback corresponds to the first component and the second component;
 determining an updated first component based at least on the third hypothesis and the second user feedback; and
 determining an updated second component based at least on the fourth hypothesis and the second user feedback.

10. The computer-implemented method of claim 5, wherein the first input data is associated with a session identifier and the method further comprises:
 storing, in a data storage, the session identifier along with the first data; and
 generating the first output data using the first hypothesis based on the first data and the session identifier stored in the data storage.

11. The computer-implemented method of claim 5, further comprising:
 receiving second data indicative of a third hypothesis, generated by the second component, being tested; and
 based on the first data, generating an instruction that prevents testing of the third hypothesis.

12. The computer-implemented method of claim 5, further comprising:
 determining that the first hypothesis is associated with a first confidence value;
 determining a second hypothesis is associated with a second confidence value;
 determining that the first confidence value and the second confidence value satisfy a condition; and
 selecting the first hypothesis for testing based on the first confidence value being less than the second confidence value.

13. A system comprising:
 at least one processor; and
 at least one memory including instructions that, when executed by the at least one processor, cause the system to:
  receive first input data corresponding to a first user input to a natural language processing system comprising of a plurality of components;
  determine, using a first component of the plurality of components, a first hypothesis usable to generate a response to the first user input;
  store first data indicating the first hypothesis is being tested, the first data including an identifier associated with the first component;
  using the first hypothesis and at least a second component of the plurality of components, generate first output data responsive to the first user input;

cause presentation of the first output data;

receive second input data corresponding to first user feedback with respect to the first output data;

determine, based on the first data, that the first user feedback corresponds to the first component; and in response to determining that the first user feedback corresponds to the first component, determine an updated first component based at least on the first hypothesis and the first user feedback.

14. The system of claim 13, wherein the first component is an ASR component, and wherein the instructions that, when executed by the at least one processor, cause the system to:

determine an alternative input representation corresponding to the first user input; and determine, based on the first data, natural language understanding (NLU) data corresponding to the first hypothesis instead of the alternative input representation.

15. The system of claim 13, wherein the first component is a NLU component, and wherein the instructions that, when executed by the at least one processor, cause the system to:

determine, by the second component, a skill component corresponding to the first hypothesis instead of a second hypothesis.

16. The system of claim 13, wherein the instructions that, when executed by the at least one processor, cause the system to:

generate second data indicating a second hypothesis as a fallback action;

receive third input data corresponding to a second user input received prior to the first user input, the second user input being associated with a dialog session including the first user input;

receive system response data representing a system response to the second user input;

process the first input data, the third input data and the system response data to determine defect data representing a likelihood of the first output data representing an undesired response to the first user input; and based on the defect data, generate third data indicating the second hypothesis is to be selected instead of the first hypothesis.

17. The system of claim 13, wherein the instructions that, when executed by the at least one processor, further cause the system to:

receive third input data corresponding to a second user input to the natural language processing system;

determine, using the first component, a third hypothesis corresponding to the third input data;

store second data indicative of the third hypothesis being tested;

determine, using the second component, a fourth hypothesis corresponding to the third input data;

determine second output data using the fourth hypothesis;

cause presentation of the second output data;

receive fourth input data representing second user feedback with respect to the second output data;

determine, based on the second data and the second output data being determined using the fourth hypothesis, that the second user feedback corresponds to the first component and the second component;

determine an updated first component based at least on the third hypothesis and the second user feedback; and determine an updated second component based at least on the fourth hypothesis and the second user feedback.

18. The system of claim 13, wherein the first input data is associated with a session identifier, and wherein the instructions that, when executed by the at least one processor, further cause the system to:

store, in a data storage, the session identifier along with the first data; and generate the first output data using the first hypothesis based on the first data and the session identifier stored in the data storage.

19. The system of claim 13, wherein the instructions that, when executed by the at least one processor, further cause the system to:

receive second data indicative of a third hypothesis, generated by the second component, being tested; and based on the first data, generate an instruction that prevents testing of the third hypothesis.

20. The system of claim 13, wherein the instructions that, when executed by the at least one processor, further cause the system to:

determine that the first hypothesis is associated with a first confidence value;

determine a second hypothesis is associated with a second confidence value;

determine that the first confidence value and the second confidence value satisfy a condition; and select the first hypothesis for testing based on the first confidence value being less than the second confidence value.

* * * * *